(12) United States Patent
Alexander et al.

(10) Patent No.: US 10,634,919 B2
(45) Date of Patent: *Apr. 28, 2020

(54) SYSTEMS, DEVICES, AND METHODS FOR OPTICAL WAVEGUIDES

(71) Applicant: NORTH INC., Kitchener (CA)

(72) Inventors: Stefan Alexander, Elmira (CA); Douglas Raymond Dykaar, Waterloo (CA); John Otto Vieth, Waterloo (CA); Timothy Paul Bodiya, Toronto (CA)

(73) Assignee: North Inc., Kitchener, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,084

(22) Filed: Sep. 11, 2018

(65) Prior Publication Data

US 2019/0079294 A1    Mar. 14, 2019

Related U.S. Application Data

(60) Provisional application No. 62/557,551, filed on Sep. 12, 2017, provisional application No. 62/557,554, filed on Sep. 12, 2017.

(51) Int. Cl.
*G02B 27/01* (2006.01)
*G06F 3/01* (2006.01)
(Continued)

(52) U.S. Cl.
CPC .......... *G02B 27/0172* (2013.01); *G02B 5/32* (2013.01); *G02B 6/2848* (2013.01); *G02B 26/0833* (2013.01); *G02B 27/0093* (2013.01); *G02B 27/0103* (2013.01); *G02B 27/0176* (2013.01); *G02F 1/1326* (2013.01); *G02F 1/29* (2013.01);
(Continued)

(58) Field of Classification Search
None
See application file for complete search history.

(56) References Cited

U.S. PATENT DOCUMENTS 8,233,204 B1    7/2012  Robbins et al.
2006/0018597 A1 1/2006  Piede et al.
(Continued)

FOREIGN PATENT DOCUMENTS

JP    4-168427 A   6/1992

*Primary Examiner* — Tina M Wong
(74) *Attorney, Agent, or Firm* — Thomas Mahon

(57) ABSTRACT

Systems, devices, and methods for optical waveguides that are well-suited for use in wearable heads-up displays (WHUDs) are described. An optical device comprises an optical waveguide including a volume of optically transparent material having a first longitudinal surface positioned opposite a second longitudinal surface across a width of the volume, an in-coupler, a liquid crystal out-coupler, and a controller to modulate a refractive index of the liquid crystal out-coupler. Light is in-coupled into the waveguide and is propagated along a length of the waveguide by total internal reflection between the longitudinal surfaces before being out-coupled by the liquid crystal out-coupler on a path that is dependent on the modulated refractive index of the liquid crystal out-coupler. In this way, light signals can be steered to create an image and/or to move an exit pupil of an image. WHUDs that employ such optical waveguides are also described.

8 Claims, 13 Drawing Sheets

(51) Int. Cl.
    *G02B 27/00*    (2006.01)
    *G02F 1/29*     (2006.01)
    *G02B 6/28*     (2006.01)
    *G02F 1/13*     (2006.01)
    *G02B 5/32*     (2006.01)
    *G02B 26/08*    (2006.01)

(52) U.S. Cl.
    CPC ...... *G06F 3/013* (2013.01); *G02B 2027/0174* (2013.01); *G02B 2027/0178* (2013.01); *G02F 2203/24* (2013.01)

(56) References Cited

U.S. PATENT DOCUMENTS

| | | |
|---|---|---|
| 2006/0159864 A1 | 7/2006 | Natarajan et al. |
| 2012/0218481 A1 | 8/2012 | Popovich et al. |
| 2014/0300966 A1* | 10/2014 | Travers .............. G02B 27/4205 359/558 |
| 2016/0154150 A1 | 6/2016 | Simmonds et al. |
| 2017/0307887 A1 | 10/2017 | Stenberg et al. |
| 2019/0079292 A1* | 3/2019 | Alexander ........... G02B 6/2848 |
| 2019/0079293 A1* | 3/2019 | Alexander ......... G02B 27/0172 |
| 2019/0079296 A1* | 3/2019 | Alexander ......... G02B 27/0176 |

* cited by examiner

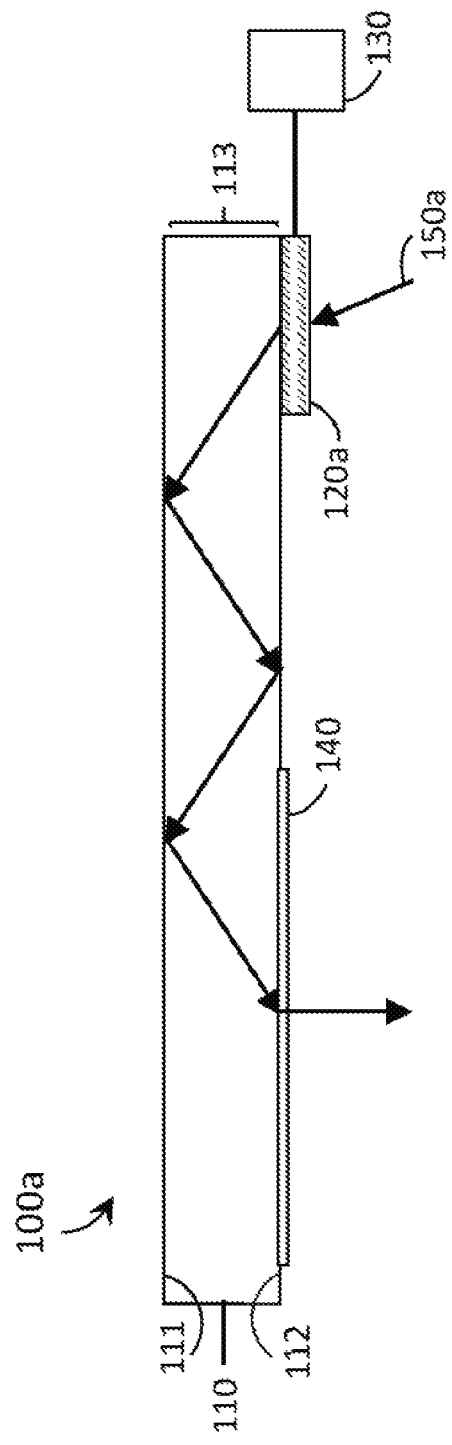
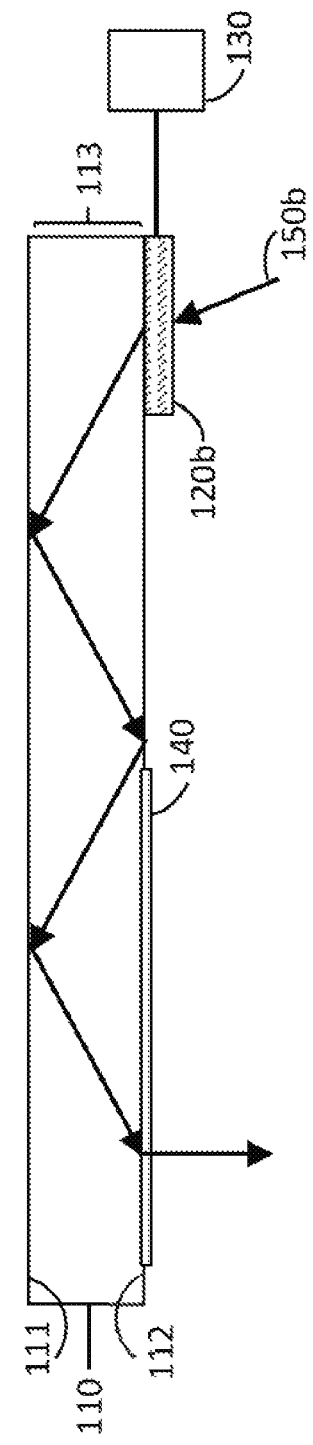
FIGURE 1A
FIGURE 1B

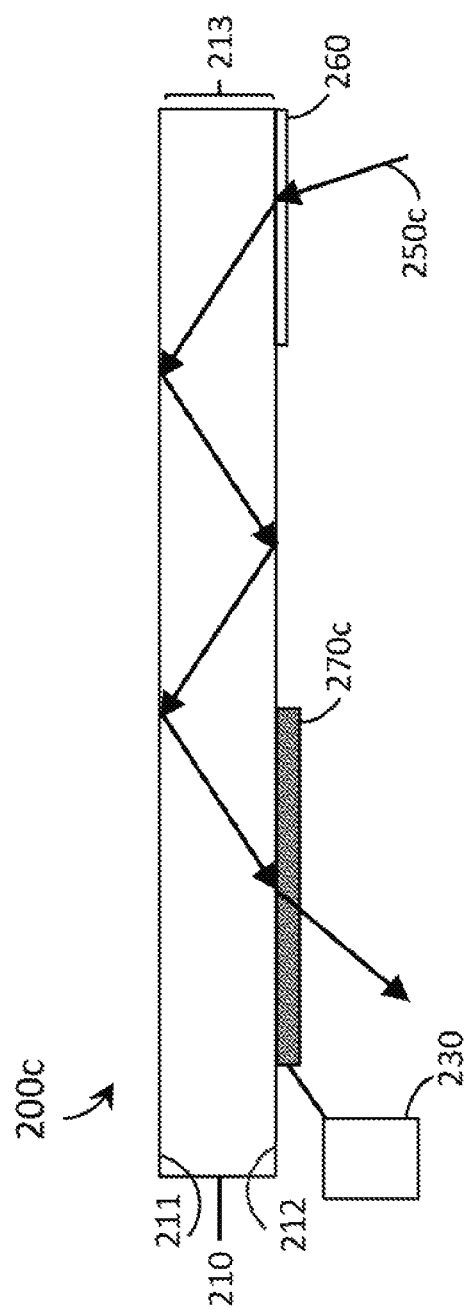

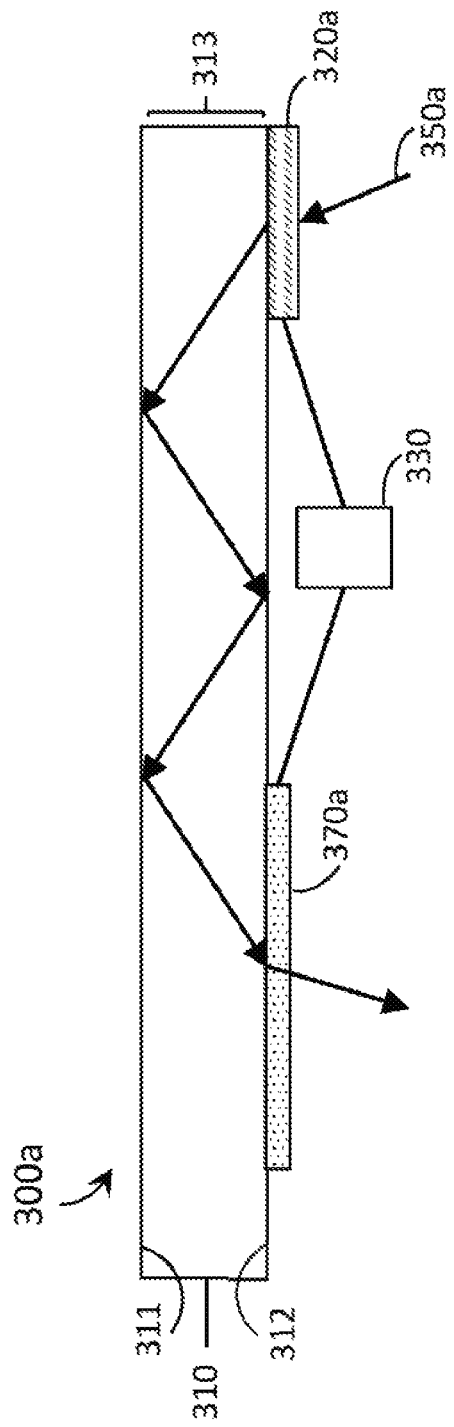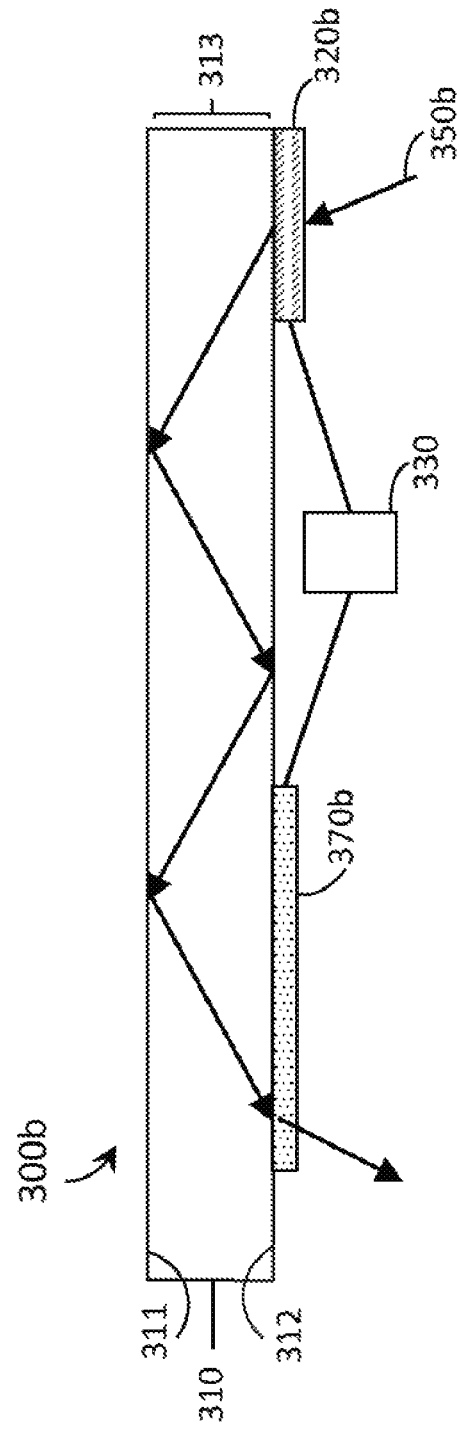

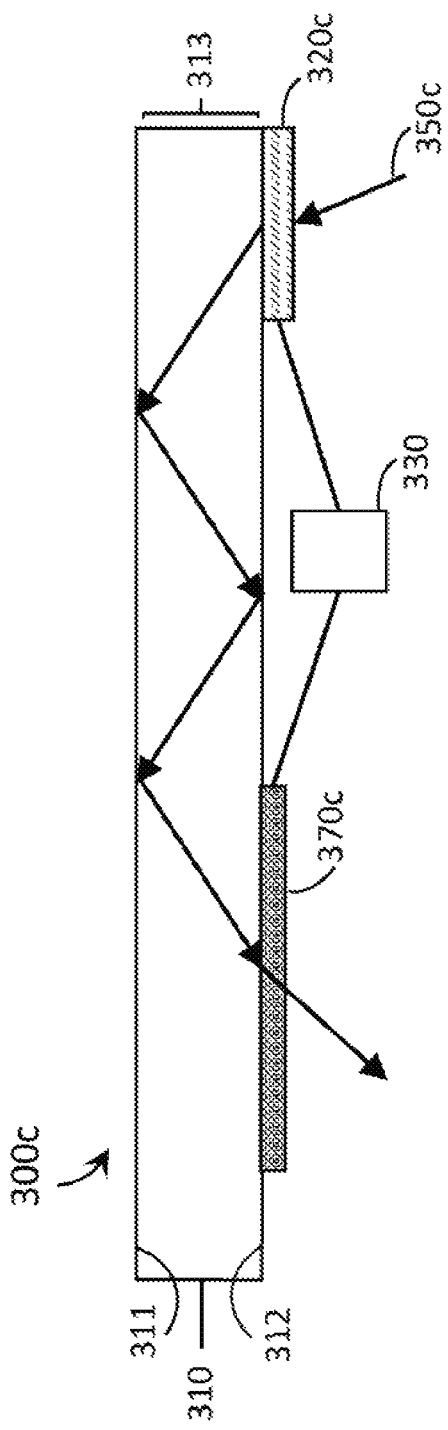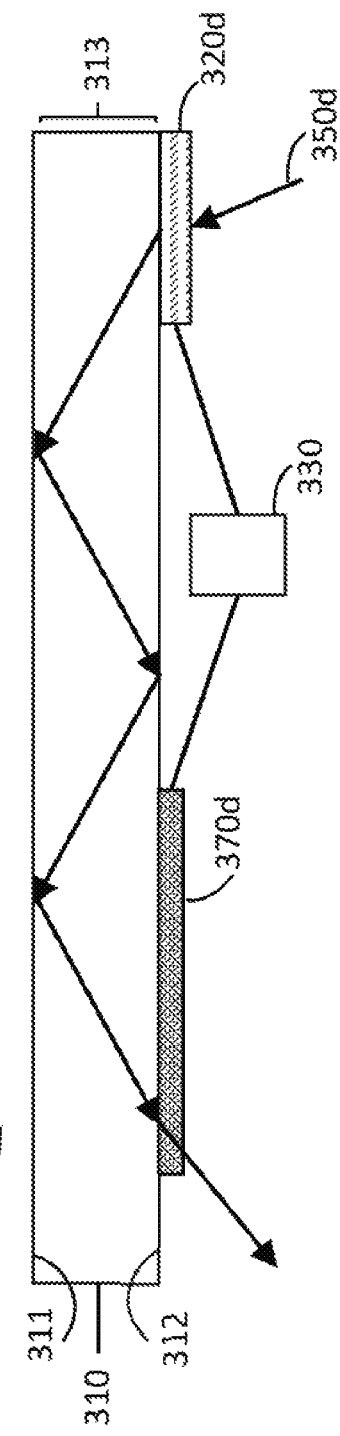
FIGURE 3C
FIGURE 3D

SYSTEMS, DEVICES, AND METHODS FOR OPTICAL WAVEGUIDES

BACKGROUND

Technical Field

The present systems, devices, and methods generally relate to steering light by optical waveguides, and particularly relate to systems, devices, and methods that employ such in wearable heads-up displays.

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

Optical Waveguides in Wearable Heads-Up Displays

A majority of currently available wearable heads-up displays employ optical waveguide systems in the transparent combiner. An optical waveguide operates under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. Optical waveguides employed in wearable heads-up displays like those mentioned above consist of rectangular prisms of material with a higher refractive index then the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Optical waveguides employ in-coupling and out-coupling to ensure that light follows a specific path along the optical waveguide and then exits the optical waveguide at a specific location and on a specific path in order to create an image that is visible to the user.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Visibility requirements of the displays of these current wearable heads-up displays necessitate larger display creation components. Most wearable heads-up displays presented to date appear very bulky and unnatural on a user's face compared to the more sleek and streamlined look of typical curved eyeglass and sunglass lenses. There is a need in the art for components which allow wearable heads-up displays to achieve the form factor and fashion appeal expected of the eyeglass frame industry while creating a large, high quality display.

BRIEF SUMMARY

An optical device may be summarized as including: an optical waveguide comprising volume of optically transparent material to propagate light signals by total internal reflection, wherein the volume of optically transparent material has a first longitudinal surface and a second longitudinal surface, the second longitudinal surface opposite the first longitudinal surface across a width of the volume of optically transparent material; an in-coupler; a liquid crystal out-coupler to tunably steer light signals; and a controller communicatively coupled to the liquid crystal out-coupler, wherein a refractive index of the liquid crystal out-coupler is modulatable in response to signals from the controller. The liquid crystal out-coupler may comprise a single modulatable region or at least two distinct, independently modulatable regions.

The out-coupler may be a liquid crystal out-coupler communicatively coupled to the controller and a refractive index of the out-coupler is modulatable in response to signals from the controller to tunably steer the light signals. The liquid crystal out-coupler may comprise a single modulatable region or at least two distinct, independently modulatable regions.

The optical device may further comprise a processor communicatively coupled to the controller to modulate the output signals from the controller.

A method of operating an optical device comprising an optical waveguide including a volume of optically transparent material having a first longitudinal surface and a second longitudinal surface, the second surface positioned opposite the first surface across a width of the volume of optically transparent material, an in-coupler, and a liquid crystal out-coupler, and a controller communicatively coupled to the liquid crystal out-coupler, may be summarized as including: in-coupling a first set of light signals by the in-coupler; propagating the first set of light signals along a length of the volume of optically transparent material by total internal reflection between the first longitudinal surface and the second longitudinal surface; modulating a refractive index of the liquid crystal out-coupler to a first refractive index by the controller; out-coupling the first set of light signals by the liquid crystal out-coupler, wherein the first set of light signals are output on a path that is dependent on the refractive index of the liquid crystal out-coupler. The method may further comprise: in-coupling the second set of light signals by the in-coupler; propagating the second set of light signals along a length of the volume of optically transparent material by total internal reflection between the first longitudinal surface and the second longitudinal surface; modulating a refractive index of the liquid crystal out-coupler to a second refractive index by the controller; out-coupling the second set of light signals by the liquid crystal out-coupler region, wherein the second set of light signals are output on a path that is dependent on the refractive index of the liquid crystal out-coupler.

A wearable heads-up display (WHUD) may be summarized as including: a support structure that in use is worn on the head of a user; a projector to generate light signals, the projector comprising at least one light source; an optical waveguide comprising a volume of optically transparent material to propagate light signals by total internal reflection, wherein the volume of optically transparent material has a first longitudinal surface and a second longitudinal surface, the second longitudinal surface opposite the first longitudinal surface across a width of the volume of optically transparent material; an in-coupler; a liquid crystal out-coupler to tunably steer light signals; and a controller communicatively coupled to the liquid crystal out-coupler, wherein a refractive index of the liquid crystal out-coupler is modulatable in response to signals from the controller. The liquid crystal out-coupler may comprise a single modulatable region or at least two distinct, independently modulatable regions.

The out-coupler may be a liquid crystal out-coupler and wherein a refractive index of the out-coupler is modulatable in response to signals from the controller to tunably steer the light signals. The liquid crystal out-coupler may comprise a single modulatable region or at least two distinct, independently modulatable regions.

The WHUD may further comprise a processor communicatively coupled to the projector to modulate the generation of light signals and communicatively coupled to the controller to modulate the output of signals from the controller.

The WHUD may further comprise a processor communicatively coupled to the projector to modulate the generation of light signals.

The WHUD may further comprise a processor communicatively coupled to the controller to modulate the output of signals from the controller.

A method of operating a wearable heads-up display (WHUD) comprising a support structure that in use is worn on the head of a user, a projector with at least one light source, an optical waveguide including a volume of optically transparent material having a first longitudinal surface opposite a second longitudinal surface across a width of the volume of optically transparent material, an in-coupler, a liquid crystal out-coupler, and a controller communicatively coupled to the liquid crystal out-coupler, may be summarized as including: generating a first set of light signals by the at least one light source of the projector; in-coupling the second set of light signals into the volume of optically transparent material by the in-coupler; propagating the second set of light signals along a length of the volume of optically transparent material by total internal reflection between the first longitudinal surface and the second longitudinal surface; modulating a refractive index of the liquid crystal out-coupler to a second refractive index by the controller; out-coupling the second set of light signals by the liquid crystal out-coupler, wherein the second set of light signals are output on a path that is dependent on the refractive index of the liquid crystal out-coupler. The method may further comprise: generating a second set of light signals by the at least one light source of the projector; in-coupling the second set of light signals into the volume of optically transparent material by the in-coupler; propagating the second set of light signals along a length of the volume of optically transparent material by total internal reflection between the first longitudinal surface and the second longitudinal surface; modulating a refractive index of the liquid crystal out-coupler to a second refractive index by the controller; out-coupling the second set of light signals by the liquid crystal out-coupler, wherein the second set of light signals are output on a path that is dependent on the refractive index of the liquid crystal out-coupler.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 1A is a schematic diagram of an optical waveguide with a liquid crystal in-coupler in accordance with the present systems, devices, and methods.

FIG. 1B is a schematic diagram of an optical waveguide with a liquid crystal in-coupler in accordance with the present systems, devices, and methods.

FIG. 2C is a schematic diagram of an optical waveguide with a liquid crystal out-coupler in accordance with the present systems, devices, and methods.

FIG. 3A is a schematic diagram of an optical waveguide with a liquid crystal in-coupler and a liquid crystal out-coupler in accordance with the present systems, devices, and methods.

FIG. 3B is a schematic diagram of an optical waveguide with a liquid crystal in-coupler and a liquid crystal out-coupler in accordance with the present systems, devices, and methods.

FIG. 3C is a schematic diagram of an optical waveguide with a liquid crystal in-coupler and a liquid crystal out-coupler in accordance with the present systems, devices, and methods.

FIG. 3D is a schematic diagram of an optical waveguide with a liquid crystal in-coupler and a liquid crystal out-coupler in accordance with the present systems, devices, and methods.

DETAILED DESCRIPTION

Figure 1C:
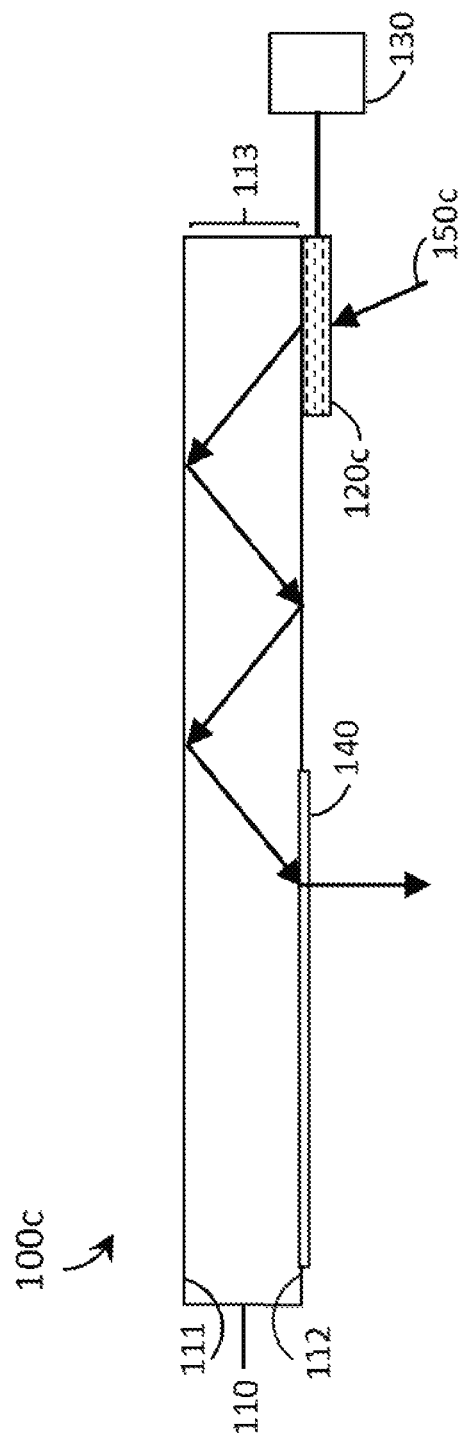
FIG. 1C is a schematic diagram of an optical waveguide with a liquid crystal in-coupler in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification the terms "in-coupler," "out-coupler" "liquid crystal in-coupler," "liquid crystal out-coupler," "non-liquid crystal in-coupler", and non-liquid crystal out-coupler" are used. The generic terms "in-coupler" and "out-coupler" may include any structure or optic that respectively in-couples or out-couples light, including but not limited to: a hologram, a holographic optical element, a volume diffraction grating, a surface relief grating, a transmission grating, a reflection grating, or a liquid crystal element, liquid crystal cell or liquid crystal stack. The terms "liquid crystal in-coupler" and liquid crystal out-coupler" refer to a modulatable liquid crystal element, modulatable liquid crystal cell or modulatable liquid crystal stack that in use respectively in-couples light to or out-couples light from an optical waveguide or slab. The terms "non-liquid crystal in-coupler" and "non-liquid crystal out-coupler" may include any element or optic that respectively in-couples light to or out-couples light from an optical waveguide or slab that does not include modulatable liquid crystal material, and may refer to: a hologram, a holographic optical element, a volume diffraction grating, a surface relief grating, a transmission grating, or a reflection grating.

"In-coupling" and "out-coupling" of light signals into and out of a waveguide does not solely refer to light signals entering and exiting the interior of the waveguide but also includes directing the light signals into and out of the waveguide on paths that enable the light signals to create the desired pattern upon exiting the waveguide. That is, an in-coupler or out-coupler does not only act to, respectively, input or output light signals while maintaining the current path of the light signals, but instead may alter the direction of any or all light signals from the path of incidence on the in-coupler or out-coupler.

The propagation of light within the waveguides discussed throughout this specification is by total internal reflection (TIR). TIR occurs when light remains in a first medium (the waveguide) upon incidence at a boundary with a second medium because the refractive index of the first medium is greater than the refractive index of the second medium and the angle of incidence of the light at the boundary is above a specific critical angle that is a function of those refractive indices. Throughout this specification when light signals are referred to as propagating down the length of a waveguide it is meant that these light signals are propagated by total internal reflection and that the light signals have met the boundary between the material of the waveguide and the medium external to the waveguide at or above the critical angle.

The headings and Abstract of the Disclosure provided herein are for convenience only and do not interpret the scope or meaning of the embodiments.

FIG. 1A is a schematic diagram of an optical waveguide 100*a* with a liquid crystal in-coupler 120*a* in accordance with the systems, devices, and methods. Optical device 100*a* includes a waveguide comprising a volume of optically transparent material 110 having a first longitudinal surface 111 positioned opposite a second longitudinal surface 112 across a width 113 of volume of optically transparent material 110, liquid crystal in-coupler 120*a*, a controller (e.g., circuitry, micro-controller) 130 communicatively coupled to liquid crystal in-coupler 120*a*, and a non-liquid crystal out-coupler 140.

Liquid crystal is a substance that exists between a liquid and a solid state. The molecules of a solid substance are generally aligned while molecules in a liquid substance have no order. Molecules of a liquid crystal may have some order but it is not uniform over the entire substance. Under external stimulation, e.g. an electric or magnetic field, the molecules of a liquid crystal can become ordered, which can result in changes to the optical properties of the liquid crystal. This phenomenon provides a method of altering the refractive index of a liquid crystal element.

Optical device 100*a* operates as follows. A first set of light signals 150*a* is incident on liquid crystal in-coupler 120*a* (all arrows represent the first set of light signals; only the first arrow in the set of arrows is labelled to reduce clutter). First set of light signals 150*a* may be a single light signal or may be multiple light signals which are incident on liquid crystal in-coupler 120*a* simultaneously. In FIG. 1A, controller 130 has output a signal to modulate liquid crystal in-coupler 120*a* to a first refractive index (represented by the shading of liquid crystal in-coupler 120*a*). Controller 130 may be communicatively coupled to a processor (e.g., microprocessor) which modulates the output of signals from controller 130. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 130. First set of light signals 150a are in-coupled into volume of optically transparent material 110 by liquid crystal in-coupler 120a. The path that first set of light signals 150a follows within volume of optically transparent material 110 is dependent on the refractive index of liquid crystal in-coupler 120a, and may be dependent on the wavelength of the light signal(s), the angle of incidence of the light signal(s) on liquid crystal in-coupler 120a, and/or the location of incidence of the light signal(s) on liquid crystal in-coupler 120a. First set of light signals 150a are propagated down the length of volume of optically transparent material 110 by total internal reflection between first longitudinal surface 111 and second longitudinal surface 112. First set of light signals 150a are out-coupled by non-liquid crystal out-coupler 140 upon incidence of first set of light signals 150a on out-coupler 140. In FIG. 1A, non-liquid crystal out-coupler 140 is located at or proximate second longitudinal surface 112 and first set of light signals 150a are out-coupled by transmission, however, in another implementation non-liquid crystal out-coupler 140 may be located elsewhere on or within volume of optically transparent material 110 and first set of light signals 150a may be out-coupled by reflection. The output path(s) of first set of lights signals 150a may depend on the wavelength of individual light signals, the location of incidence of individual light signals on non-liquid crystal out-coupler 140, and the location of incidence of individual light signals on non-liquid crystal out-coupler 140. This process may be repeated for subsequent sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g. raster scanning). If each of light signals comprises multiple light signals, modulating the refractive index of the liquid crystal in-coupler may steer an exit pupil of an image (or portion of an image) or other desired pattern created by the multiple light signals.

FIGS. 1B and 1C show examples of other refractive indices of the liquid crystal in-coupler and the resulting out-coupling locations of the light signal(s).

FIG. 1B is a schematic diagram of an optical device 100b with a liquid crystal in-coupler 120b in accordance with the present systems, devices, and methods. Optical device 100b includes a waveguide comprising a volume of optically transparent material 110 having a first longitudinal surface 111 positioned opposite a second longitudinal surface 112 across a width 113 of volume of optically transparent material 110, liquid crystal in-coupler 120b, a controller (e.g., circuitry, micro-controller) 130 communicatively coupled to liquid crystal in-coupler 120b, and a non-liquid crystal out-coupler 140. Optical device 100b is the same as or similar to optical device 100a but FIG. 1B shows a second set of light signals 150b incident on liquid crystal in-coupler 120b which has a second refractive index. Optical device 100b operates as follows.

Second set of light signals 150b is incident on liquid crystal in-coupler 120b (all arrows represent the second set of light signals; only the first arrow in the set of arrows is labelled to reduce clutter). Second set of light signals 150b may be a single light signal or may be multiple light signals which are incident on liquid crystal in-coupler 120b simultaneously. In FIG. 1B, controller 130 has output a signal to modulate liquid crystal in-coupler 120b to a second refractive index (represented by the shading of liquid crystal in-coupler 120b). Second set of light signals 150b are in-coupled into volume of optically transparent material 110 by liquid crystal in-coupler 120b. The path that second set of light signals 150b follows within volume of optically transparent material 110 is dependent on the refractive index of liquid crystal in-coupler 120b, and may be dependent on the wavelength of the light signal(s), the angle of incidence of the light signal(s) on liquid crystal in-coupler 120b, and/or the location of incidence of the light signal(s) on liquid crystal in-coupler 120b. Second set of light signals 150b are propagated down the length of volume of optically transparent material 110 by total internal reflection between first longitudinal surface 111 and second longitudinal surface 112. Second set of light signals 150b are out-coupled by non-liquid crystal out-coupler 140 upon incidence of second set of light signals 150b on non-liquid crystal out-coupler 140. The output path(s) of second set of lights signals 150b may depend on the wavelength of individual light signals, the location of incidence of individual light signals on non-liquid crystal out-coupler 140, and the location of incidence of individual light signals on non-liquid crystal out-coupler 140. The second refractive index of liquid crystal in-coupler 120b causes second set of light signals 150b to be refracted more than the first set of light signals 150a and to travel further down the length of volume of optically transparent material 110 before being out-coupled by non-liquid crystal out-coupler 140. In FIG. 1B, non-liquid crystal out-coupler 140 is located at or proximate second longitudinal surface 112 and second set of light signals 150b are out-coupled by transmission, however, in another implementation non-liquid crystal out-coupler 140 may be located elsewhere on or within volume of optically transparent material 110 and second set of light signals 150b may be out-coupled by reflection.

FIG. 1C is a schematic diagram of an optical device 100c with a liquid crystal in-coupler 120c in accordance with the present systems, devices, and methods. Optical device 100c includes a waveguide comprising a volume of optically transparent material 110 having a first longitudinal surface 111 positioned opposite a second longitudinal surface 112 across a width 113 of volume of optically transparent material 110, liquid crystal in-coupler 120c, a controller (e.g., circuitry, micro-controller) 130 communicatively coupled to liquid crystal in-coupler 120c, and a non-liquid crystal out-coupler 140. Optical device 100c is the same as or similar to optical device 100a and optical device 100b, but FIG. 1C shows a third set of light signals 150c incident on liquid crystal in-coupler 120c which has a third refractive index. Optical device 100c operates as follows.

Third set of light signals 150c is incident on liquid crystal in-coupler 120c (all arrows represent the third set of light signals; only the first arrow in the set of arrows is labelled to reduce clutter). Third set of light signals 150c may be a single light signal or may be multiple light signals which are incident on liquid crystal in-coupler 120c simultaneously. In FIG. 1C, controller 130 has output a signal to modulate liquid crystal in-coupler 120c to a third refractive index (represented by the shading of liquid crystal in-coupler 120c). Third set of light signals 150c are in-coupled into volume of optically transparent material 110 by liquid crystal in-coupler 120c. The path that third set of light signals 150c follows within volume of optically transparent material 110 is dependent on the refractive index of liquid crystal in-coupler 120c, and may be dependent on the wavelength of the light signal(s), the angle of incidence of the light signal(s) on liquid crystal in-coupler 120c, and/or the location of incidence of the light signal(s) on liquid crystal in-coupler 120c. Third set of light signals 150c are propagated down the length of volume of optically transparent material 110 by total internal reflection between first longitudinal surface 111 and second longitudinal surface 112. Third set of light signals 150c are out-coupled by non-liquid crystal out-coupler 140 upon incidence of third set of light signals 150c on non-liquid crystal out-coupler 140. The output path(s) of third set of lights signals 150c may depend on the wavelength of individual light signals, the location of incidence of individual light signals on non-liquid crystal out-coupler 140, and the location of incidence of individual light signals on non-liquid crystal out-coupler 140. The third refractive index of liquid crystal in-coupler 120c causes third set of light signals 150b to be refracted less than the first set of light signals 150a and to travel less distance down the length of volume of optically transparent material 110 before being out-coupled by non-liquid crystal out-coupler 140. In FIG. 1C, non-liquid crystal out-coupler 140 is located at or proximate second longitudinal surface 112 and third set of light signals 150c are out-coupled by transmission, however, in another implementation non-liquid crystal out-coupler 140 may be located elsewhere on or within volume of optically transparent material 110 and third set of light signals 150c may be out-coupled by reflection.

Throughout this specification and in the drawings, liquid crystal in-couplers or in-coupler are shown and discussed as being located parallel to the first longitudinal surface and the second longitudinal surface of the volume of optically transparent material of the waveguide. However, light signals may enter the volume of optically transparent material at an "end" of the volume of optically transparent material, i.e., at a surface that is not along a length of the optical waveguide, and therefore the liquid crystal in-coupler or in-coupler may also be perpendicular to the length of the waveguide.

Figure 2A:
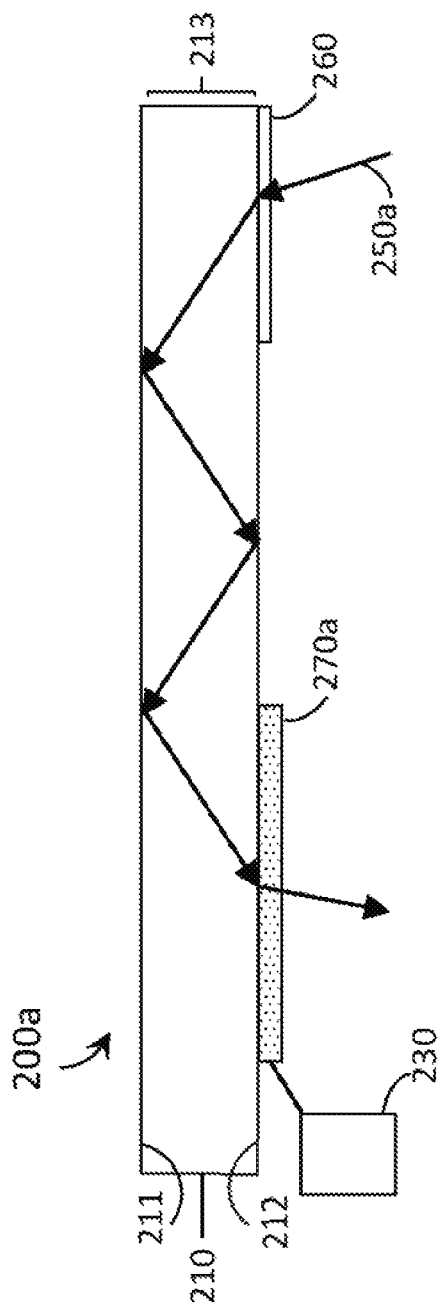
FIG. 2A is a schematic diagram of an optical waveguide with a liquid crystal out-coupler in accordance with the present systems, devices, and methods.

FIG. 2A is a schematic diagram of an optical device 200a with a liquid crystal out-coupler in accordance with the present systems, devices, and methods. Optical device 200a includes a waveguide comprising a volume of optically transparent material 210 having a first longitudinal surface 211 positioned opposite a second longitudinal surface 212 across a width 213 of volume of optically transparent material 210, a non-liquid crystal in-coupler 260, a liquid crystal out-coupler 270a, and a controller (e.g., circuitry, micro-controller) 230 communicatively coupled to liquid crystal in-coupler 270a. Optical device 200a operates as follows.

A first set of light signals 250a is incident on non-liquid crystal in-coupler 260 (all arrows represent the first set of light signals; only the first arrow in the set of arrows is labelled to reduce clutter). First set of light signals 250a may be a single light signal or may be multiple light signals which are incident on non-liquid crystal in-coupler 260 simultaneously. First set of light signals 250a are in-coupled into volume of optically transparent material 210 by non-liquid crystal in-coupler 260. The path that first set of light signals 250a follows within volume of optically transparent material 210 may be dependent on the wavelength of the light signal(s), the angle of incidence of the light signal(s) on non-liquid crystal in-coupler 260, and/or the location of incidence of the light signal(s) on non-liquid crystal in-coupler 260. First set of light signals 250a are propagated down the length of volume of optically transparent material 210 by total internal reflection between first longitudinal surface 211 and second longitudinal surface 212. First set of light signals 250a are out-coupled by liquid crystal out-coupler 270a upon incidence of first set of light signals 250a on liquid crystal out-coupler 270a. In FIG. 2A, controller 230 has output a signal to modulate liquid crystal out-coupler 270a to a first refractive index (represented by the shading of liquid crystal out-coupler 270a). Controller 230 may be communicatively coupled to a processor which modulates the output of signals from controller 230. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 230. In FIG. 2A, liquid crystal out-coupler 270a is located at or proximate second longitudinal surface 212 and first set of light signals 250a are out-coupled by transmission, however, in another implementation liquid crystal out-coupler 270a may be located elsewhere on or within volume of optically transparent material 210 and first set of light signals 250a may be out-coupled by reflection. The output path of first set of lights signals 250a may also depend on the wavelength of individual light signals, the location of incidence of individual light signals on liquid crystal out-coupler 270a, and the location of incidence of individual light signals on liquid crystal out-coupler 270a. If first set of light signals 250a is a single light signal, an image or other desired pattern of light may be created by modulating the refractive index of liquid crystal out-coupler 270a over time to steer a single beam over time. This process may be repeated for subsequent sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g. raster scanning). If each of light signals comprises multiple light signals, modulating the refractive index of the liquid crystal in-coupler may steer an exit pupil of an image (or portion of an image) or other desired pattern created by the multiple light signals.

Figure 2B:
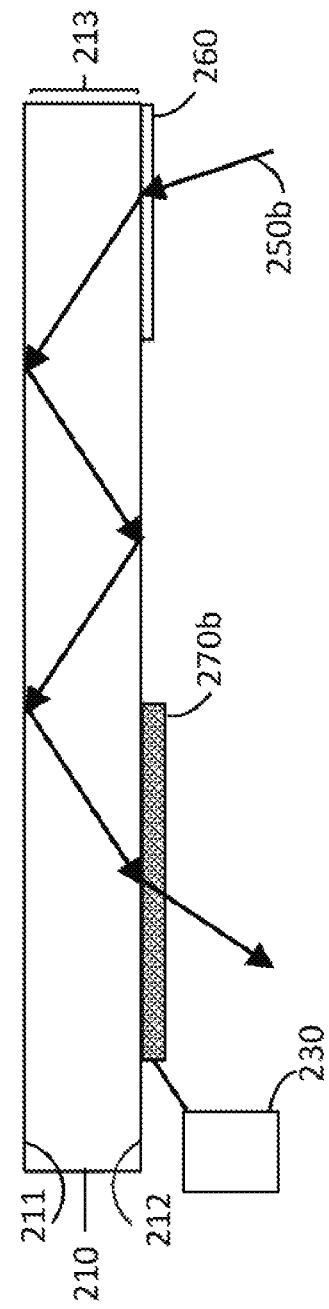
FIG. 2B is a schematic diagram of an optical waveguide with a liquid crystal out-coupler in accordance with the present systems, devices, and methods.

FIG. 2B is a schematic diagram of an optical device 200b with a liquid crystal out-coupler in accordance with the present systems, devices, and methods. Optical device 200b includes a waveguide comprising a volume of optically transparent material 210 having a first longitudinal surface 211 positioned opposite a second longitudinal surface 212 across a width 213 of volume of optically transparent material 210, a non-liquid crystal in-coupler 260, a liquid crystal out-coupler 270b, and a controller (e.g., circuitry, micro-controller) 230 communicatively coupled to liquid crystal in-coupler 270b. Optical device 200b is the same as or similar to optical device 200a but FIG. 2B shows a second set of light signals 250b incident and liquid crystal out-coupler 270b has a second refractive index. Optical device 200b operates as follows.

A second set of light signals 250b is incident on non-liquid crystal in-coupler 260 (all arrows represent the second set of light signals; only the first arrow in the set of arrows is labelled to reduce clutter). Second set of light signals 250b may be a single light signal or may be multiple light signals which are incident on non-liquid crystal in-coupler 260 simultaneously. Second set of light signals 250b are in-coupled into volume of optically transparent material 210 by non-liquid crystal in-coupler 260. The path that second set of light signals 250*b* follows within volume of optically transparent material 210 may be dependent on the wavelength of the light signal(s), the angle of incidence of the light signal(s) on non-liquid crystal in-coupler 260, and/or the location of incidence of the light signal(s) on non-liquid crystal in-coupler 260. Second set of light signals 250*b* are propagated down the length of volume of optically transparent material 210 by total internal reflection between first longitudinal surface 211 and second longitudinal surface 212. Second set of light signals 250*b* are out-coupled by liquid crystal out-coupler 270*b* upon incidence of second set of light signals 250*b* on liquid crystal out-coupler 270*b*. In FIG. 2B, controller 230 has output a signal to modulate liquid crystal out-coupler 270*b* to a second refractive index (represented by the shading of liquid crystal out-coupler 270*b*). Second set of light signals 250*b* are out-coupled from optical device 200*b* on a different path than light signals 250*a* in FIG. 1A, the output path dependent on the second refractive index of liquid crystal out-coupler 270*b*. The output path of second set of lights signals 250*b* may also depend on the wavelength of individual light signals, the location of incidence of individual light signals on liquid crystal out-coupler 270*b*, and the location of incidence of individual light signals on liquid crystal out-coupler 270*b*. In FIG. 2B, liquid crystal out-coupler 270*b* is located at or proximate second longitudinal surface 212 and second set of light signals 250*b* are out-coupled by transmission, however, in another implementation liquid crystal out-coupler 270*b* may be located elsewhere on or within volume of optically transparent material 210 and second set of light signals 250*b* may be out-coupled by reflection.

FIG. 2C is a schematic diagram of an optical device 200*c* with a liquid crystal out-coupler in accordance with the present systems, devices, and methods. Optical device 200*c* includes a waveguide comprising a volume of optically transparent material 210 having a first longitudinal surface 211 positioned opposite a second longitudinal surface 212 across a width 213 of volume of optically transparent material 210, a non-liquid crystal in-coupler 260, a liquid crystal out-coupler 270*c*, and a controller (e.g., circuitry, micro-controller) 230 communicatively coupled to liquid crystal in-coupler 270*c*. Optical device 200*c* is the same as or similar to optical device 200*a* and optical device 200*b* but FIG. 2C shows a third set of light signals 250*c* incident and liquid crystal out-coupler 270*c* has a second refractive index. Optical device 200*c* operates as follows.

A third set of light signals 250*c* is incident on non-liquid crystal in-coupler 260 (all arrows represent the first set of light signals; only the first arrow in the set of arrows is labelled to reduce clutter). Third set of light signals 250*c* may be a single light signal or may be multiple light signals which are incident on non-liquid crystal in-coupler 260 simultaneously. Third set of light signals 250*c* are in-coupled into volume of optically transparent material 210 by non-liquid crystal in-coupler 260. The path that third set of light signals 250*c* follows within volume of optically transparent material 210 may be dependent on the wavelength of the light signal(s), the angle of incidence of the light signal(s) on non-liquid crystal in-coupler 260, and/or the location of incidence of the light signal(s) on non-liquid crystal in-coupler 260. Third set of light signals 250*c* are propagated down the length of volume of optically transparent material 210 by total internal reflection between first longitudinal surface 211 and third longitudinal surface 212. Third set of light signals 250*c* are out-coupled by liquid crystal out-coupler 270*c* upon incidence of third set of light signals 250*c* on liquid crystal out-coupler 270*c*. In FIG. 2C, controller 230 has output a signal to modulate liquid crystal out-coupler 270*c* to a third refractive index (represented by the shading of liquid crystal out-coupler 270*c*). Third set of light signals 250*c* are out-coupled from optical device 200*c* on a different path than light signals 250*a* and light signals 250*b* in FIGS. 1A and 1B, the output path dependent on the third refractive index of liquid crystal out-coupler 270*c*. The output path of third set of lights signals 250*c* may also depend on the wavelength of individual light signals, the location of incidence of individual light signals on liquid crystal out-coupler 270*c*, and the location of incidence of individual light signals on liquid crystal out-coupler 270*c*. In FIG. 2C, liquid crystal out-coupler 270*c* is located at or proximate second longitudinal surface 212 and third set of light signals 250*c* are out-coupled by transmission, however, in another implementation liquid crystal out-coupler 270*c* may be located elsewhere on or within volume of optically transparent material 210 and third set of light signals 250*c* may be out-coupled by reflection.

FIG. 3A is a schematic diagram of an optical device 300*a* with a liquid crystal in-coupler 320*a* and a liquid crystal out-coupler 370*a* in accordance with the present systems, devices, and methods. Optical device 300*a* includes a waveguide comprising a volume of optically transparent material 310 having a first longitudinal surface 311 positioned opposite a second longitudinal surface 312 across a width 313 of volume of optically transparent material 310, a liquid crystal in-coupler 320*a*, a liquid crystal out-coupler 370*a*, and a controller (e.g., circuitry, micro-controller) 330 communicatively coupled to both liquid crystal in-coupler 320*a* and liquid crystal out-coupler 370*a*. Optical device 300*a* operates as follows.

A first set of light signals 350*a* is incident on liquid crystal in-coupler 320*a* (all arrows represent the first set of light signals; only the first arrow in the set of arrows is labelled to reduce clutter). First set of light signals 350*a* may be a single light signal or may be multiple light signals which are incident on liquid crystal in-coupler 320*a* simultaneously. In FIG. 3A, controller 330 has output a signal to modulate liquid crystal in-coupler 320*a* to a first refractive index (represented by the shading of liquid crystal in-coupler 320*a*). First set of light signals 350*a* are in-coupled into volume of optically transparent material 310 by liquid crystal in-coupler 320*a*. The path that first set of light signals 350*a* follows within volume of optically transparent material 310 is dependent on the refractive index of liquid crystal in-coupler 320*a*, and may be dependent on the wavelength of the light signal(s), the angle of incidence of the light signal(s) on liquid crystal in-coupler 320*a*, and/or the location of incidence of the light signal(s) on liquid crystal in-coupler 320*a*. First set of light signals 350*a* are propagated down the length of volume of optically transparent material 310 by total internal reflection between first longitudinal surface 311 and second longitudinal surface 312. In FIG. 3A, controller 330 has output a signal to modulate liquid crystal out-coupler 370*a* to a first refractive index (the first refractive index of liquid crystal in-coupler 320*a* and the first refractive index of liquid crystal out-coupler 370*a* may be the same or may be different refractive indices; the first refractive index of liquid crystal out-coupler 370*a* is represented by shading). Controller 330 may be communicatively coupled to a processor (e.g., microprocessor) which modulates the output of signals from controller 330. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 330. First set of light signals 350a are out-coupled by liquid crystal out-coupler 370a upon incidence of first set of light signals 350a on liquid crystal out-coupler 370a. The output path of first set of light signals 350a from optical device 300a is dependent on the refractive index of liquid crystal out-coupler 370a, and may be dependent on the wavelength of the light signal(s), the angle of incidence of the light signal(s) on liquid crystal out-coupler 370a, and/or the location of incidence of the light signal(s) on liquid crystal out-coupler 370a. This process may be repeated for subsequent sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g., raster scanning). If each of light signals comprises multiple light signals, modulating the refractive index of the liquid crystal in-coupler may steer an exit pupil of an image (or portion of an image) or other desired pattern created by the multiple light signals.

FIGS. 3B, 3C, and 3D show other examples of modulating the respective refractive indices of the liquid crystal in-coupler and the liquid crystal out-coupler and the resulting out-coupling locations of the light signal(s).

FIG. 3B is a schematic diagram of an optical device 300b with a liquid crystal in-coupler 320b and a liquid crystal out-coupler 370b in accordance with the present systems, devices, and methods. Optical device 300b includes a waveguide comprising a volume of optically transparent material 310 having a first longitudinal surface 311 positioned opposite a second longitudinal surface 312 across a width 313 of volume of optically transparent material 310, a liquid crystal in-coupler 320b, a liquid crystal out-coupler 370b, and a controller (e.g., circuitry, micro-controller) 330 communicatively coupled to both liquid crystal in-coupler 320b and liquid crystal out-coupler 370b. Optical device 300b is the same as or similar to optical device 300a but a second set of light signals 350b is shown and liquid crystal in-coupler 320b has a second refractive index. Optical device 300b operates as follows.

A second set of light signals 350b is incident on liquid crystal in-coupler 320b (all arrows represent the second set of light signals; only the first arrow in the set of arrows is labelled to reduce clutter). Second set of light signals 350b may be a single light signal or may be multiple light signals which are incident on liquid crystal in-coupler 320b simultaneously. In FIG. 3B, controller 330 has output a signal to modulate liquid crystal in-coupler 320b to a second refractive index (represented by the shading of liquid crystal in-coupler 320b). Second set of light signals 350b are in-coupled into volume of optically transparent material 310 by liquid crystal in-coupler 320b. The path that second set of light signals 350b follows within volume of optically transparent material 310 is dependent on the refractive index of liquid crystal in-coupler 320b, and may be dependent on the wavelength of the light signal(s), the angle of incidence of the light signal(s) on liquid crystal in-coupler 350b, and/or the location of incidence of the light signal(s) on liquid crystal in-coupler 350b. Second set of light signals 350b are propagated down the length of volume of optically transparent material 310 by total internal reflection between first longitudinal surface 311 and second longitudinal surface 312. In FIG. 3B, controller 330 has output a signal to modulate liquid crystal out-coupler 370b to the first refractive index. Second set of light signals 350b are out-coupled by liquid crystal out-coupler 370b upon incidence of second set of light signals 350b on liquid crystal out-coupler 370b. The output path of second set of light signals 350b from optical device 300b is dependent on the refractive index of liquid crystal out-coupler 370b. The output path of second set of lights signals 350b may also depend on the wavelength of individual light signals, the location of incidence of individual light signals on liquid crystal out-coupler 370b, and the location of incidence of individual light signals on liquid crystal out-coupler 370b. Because second set of light signals 350b passed through the second refractive index of liquid crystal in-coupler 320b instead of first refractive index of liquid crystal in-coupler 320a, light signals 350b travel further down the length of volume of optically transparent material 310 before being output.

FIG. 3C is a schematic diagram of an optical device 300c with a liquid crystal in-coupler 320c and a liquid crystal out-coupler 370c in accordance with the present systems, devices, and methods. Optical device 300c includes a waveguide comprising a volume of optically transparent material 310 having a first longitudinal surface 311 positioned opposite a second longitudinal surface 312 across a width 313 of volume of optically transparent material 310, a liquid crystal in-coupler 320c, a liquid crystal out-coupler 370c, and a controller (e.g., circuitry, micro-controller) 330 communicatively coupled to both liquid crystal in-coupler 320c and liquid crystal out-coupler 370c. Optical device 300c is the same as or similar to optical device 300a and optical device 300b but a third set of light signals 350c is shown and liquid crystal out-coupler 370c has a second refractive index. Optical device 300c operates as follows.

A third set of light signals 350c is incident on liquid crystal in-coupler 320c (all arrows represent the third set of light signals; only the first arrow in the set of arrows is labelled to reduce clutter). Third set of light signals 350c may be a single light signal or may be multiple light signals which are incident on liquid crystal in-coupler 320c simultaneously. In FIG. 3C, controller 330 has output a signal to modulate liquid crystal in-coupler 320c to the first refractive index (represented by the shading of liquid crystal in-coupler 320c). Third set of light signals 350c are in-coupled into volume of optically transparent material 310 by liquid crystal in-coupler 320c. The path that third set of light signals 350c follows within volume of optically transparent material 310 is dependent on the refractive index of liquid crystal in-coupler 320c, and may be dependent on the wavelength of the light signal(s), the angle of incidence of the light signal(s) on liquid crystal in-coupler 320c, and/or the location of incidence of the light signal(s) on liquid crystal in-coupler 320c. Third set of light signals 350c are propagated down the length of volume of optically transparent material 310 by total internal reflection between first longitudinal surface 311 and second longitudinal surface 312. In FIG. 3C, controller 330 has output a signal to modulate liquid crystal out-coupler 370c to a second refractive index. Third set of light signals 350c are out-coupled by liquid crystal out-coupler 370c upon incidence of third set of light signals 350c on liquid crystal out-coupler 370c. The output path of third set of light signals 350c from optical device 300c is dependent on the refractive index of liquid crystal out-coupler 370c. The output path of third set of lights signals 350c may also depend on the wavelength of individual light signals, the location of incidence of individual light signals on liquid crystal out-coupler 370c, and the location of incidence of individual light signals on liquid crystal out-coupler 370c. Because third set of light signals 350c passed through the second refractive index of liquid crystal out-coupler 370b instead of first refractive index of liquid crystal out-coupler 370a, light signals 350c exit waveguide 300c at the same location as first set of light signals 350a, but at an angle further from perpendicular to second longitudinal surface 312 than both light signals 350a and 350b.

FIG. 3D is a schematic diagram of an optical device 300d with a liquid crystal in-coupler 320d and a liquid crystal out-coupler 370d in accordance with the present systems, devices, and methods. Optical device 300d includes a waveguide comprising a volume of optically transparent material 310 having a first longitudinal surface 311 positioned opposite a second longitudinal surface 312 across a width 313 of volume of optically transparent material 310, a liquid crystal in-coupler 320d, a liquid crystal out-coupler 370d, and a controller (e.g., circuitry, micro-controller) 330 communicatively coupled to both liquid crystal in-coupler 320d and liquid crystal out-coupler 370d. Optical device 300d is the same as or similar to optical device 300a, optical device 300b, and optical device 300c but a fourth set of light signals 350d is shown and both liquid crystal in-coupler 320d and liquid crystal out-coupler 370d have a respective second refractive indices. Optical device 300a operates as follows.

A fourth set of light signals 350d is incident on liquid crystal in-coupler 320d (all arrows represent the fourth set of light signals; only the first arrow in the set of arrows is labelled to reduce clutter). Fourth set of light signals 350d may be a single light signal or may be multiple light signals which are incident on liquid crystal in-coupler 320d simultaneously. In FIG. 3D, controller 330 has output a signal to modulate liquid crystal in-coupler 320d to the second refractive index (represented by the shading of liquid crystal in-coupler 320d). Fourth set of light signals 350d are in-coupled into volume of optically transparent material 310 by liquid crystal in-coupler 320d. The path that fourth set of light signals 350d follows within volume of optically transparent material 310 is dependent on the refractive index of liquid crystal in-coupler 320d, and may be dependent on the wavelength of the light signal(s), the angle of incidence of the light signal(s) on liquid crystal in-coupler 320d, and/or the location of incidence of the light signal(s) on liquid crystal in-coupler 320d. Fourth set of light signals 350d are propagated down the length of volume of optically transparent material 310 by total internal reflection between first longitudinal surface 311 and second longitudinal surface 312. In FIG. 3D, controller 330 has output a signal to modulate liquid crystal out-coupler 370d to a second refractive index. Fourth set of light signals 350d are out-coupled by liquid crystal out-coupler 370d upon incidence of fourth set of light signals 350d on liquid crystal out-coupler 370d. The output path of fourth set of light signals 350d from optical device 300d is dependent on the refractive index of liquid crystal out-coupler 370d. The output path of third set of lights signals 350d may also depend on the wavelength of individual light signals, the location of incidence of individual light signals on liquid crystal out-coupler 370d, and the location of incidence of individual light signals on liquid crystal out-coupler 370d. Because fourth set of light signals 350c passed through the second refractive index of liquid crystal in-coupler 320d instead of first refractive index of liquid crystal in-couplers 320a and 320c, and also passed through the second refractive index of liquid crystal out-coupler 370d instead of the refractive index of liquid crystal out-couplers 370a and 370b, fourth set of light signals 350d exit waveguide 300d at the same location as second set of light signals 350a, but at an angle further from perpendicular to second longitudinal surface 312 than light signals 350a, and 350b.

Figure 4:
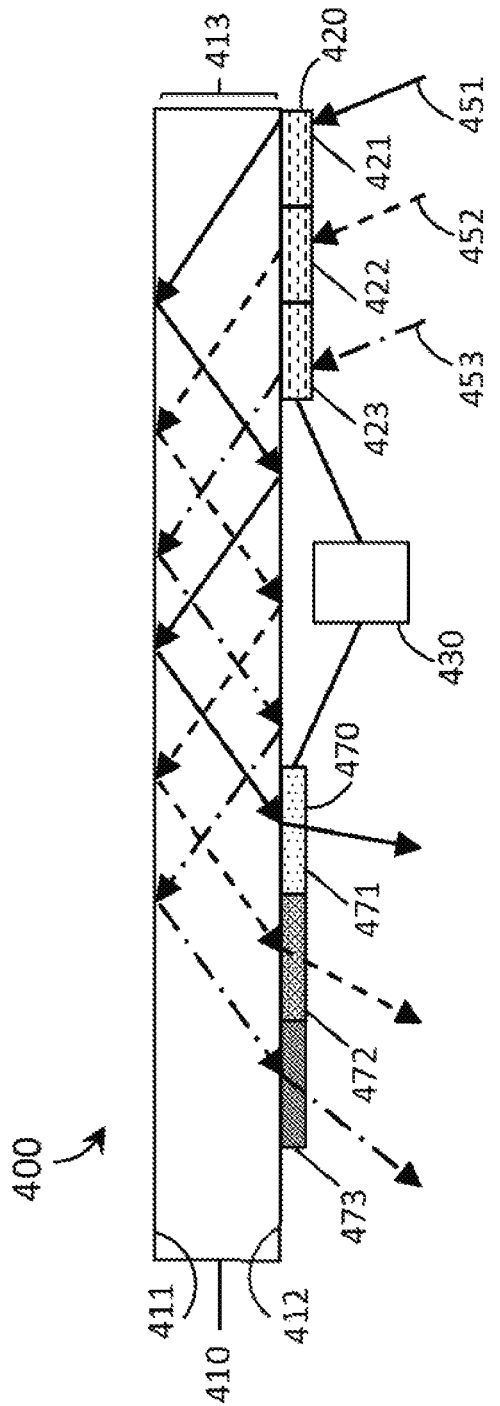
FIG. 4 is a schematic diagram of an optical waveguide with a liquid crystal in-coupler with multiple modulatable regions and a liquid crystal out-coupler with multiple modulatable regions in accordance with the present systems, devices, and methods.

FIG. 4 is a schematic diagram of an optical device 400 with a liquid crystal in-coupler 420 with multiple modulatable regions 421, 422, and 423 and a liquid crystal out-coupler 470 with multiple modulatable regions 471, 472, and 473 in accordance with the present systems, devices, and methods. FIGS. 1, 2, and 3 all show liquid crystal in-couplers and/or liquid crystal out-couplers with only one modulatable region. However, both liquid crystal in-couplers and liquid crystal out-couplers could include at least two distinct, independently modulatable regions. Optical device 400 includes a waveguide comprising a volume of optically transparent material 410 having a first longitudinal surface 411 positioned opposite a second longitudinal surface 412 across a width 413 of volume of optically transparent material 410, a liquid crystal in-coupler 420 with multiple modulatable regions 421, 422, and 423, a liquid crystal out-coupler 470 with multiple modulatable regions 471, 472, and 473, and a controller (e.g., circuitry, micro-controller) 430 communicatively coupled to both liquid crystal in-coupler 420 and liquid crystal out-coupler 470. Controller 430 modulates each of modulatable regions 421, 422, and 423, independently and may be separately communicatively coupled to each modulatable region (controller 430 is shown as having only one coupling to each of liquid crystal in-coupler 420 and liquid crystal out-coupler 470 to reduce clutter). Controller 430 is shown in this configuration solely for clarity and in an actual implementation would not be so located. Controller 430 may be communicatively coupled to a processor (e.g., microprocessor) which modulates the output of signals from controller 430. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 430. Optical device 400 operates as follows.

Light signals 451 (solid line arrows), 452 (dashed line arrows) and 453 (dashed and dotted line arrows) are incident on liquid crystal in-coupler 420 (only the first arrow for each light signal is labelled to reduce clutter). Liquid crystal in-coupler 420 has three independently modulatable regions. Each of light signals 451, 452, and 453 are incident on a respective one of modulatable regions 421, 422, and 423 of liquid crystal in-coupler 420. In FIG. 4, controller 430 has modulated each modulatable region of liquid crystal in-coupler 420 to have the same refractive index and therefore light signals 451, 452, and 453 which are incident on liquid crystal in-coupler 420 at the same angle but at different locations are in-coupled into volume of optically transparent material 410 on paths with identical angles but different locations. Modulatable regions 421, 422, and 423 of liquid crystal in-coupler 420 may be modulated by controller 430 to have different refractive indices. Light signals 451, 452, and 453 are propagated along optical device 400 by total internal reflection between first longitudinal surface 411 and second longitudinal surface 412. Light signals 451, 452, and 453 are incident on liquid crystal out-coupler 470. Each of light signals 451, 452, and 453 are incident on a respective one of modulatable regions 471, 472, and 473 of liquid crystal out-coupler 470. In FIG. 4, modulatable regions 471, 472, and 473 of liquid crystal out-coupler 470 has been modulated by controller 430 to have different refractive indices and therefore light signals 451, 452, and 453 which are incident on liquid crystal in-coupler 470 at the same angle but at different location are out-coupled towards a user on paths with different angles. Independently modulating the regions of liquid crystal in-coupler 420 and/or liquid crystal out-coupler 470 enables more freedom in image creation both spatially and temporally. As in earlier figures, light signals 451, 452, and 453 are only exemplary and may each be representative of multiple light signals. The relative dimensions of liquid crystal in-coupler 420, liquid crystal out-coupler 470, and their respective modulatable regions are exemplary and are not necessarily representative of actual dimensions. In other implementations, only one of liquid crystal in-coupler 420 or liquid crystal out-coupler 470 may have multiple modulatable regions. In other implementations, each independently modulatable region of liquid crystal in-coupler 420 or liquid crystal out-coupler 470 may have a respective controller.

In other implementations, a liquid crystal out-coupler with a single modulatable region or individual modulatable regions of a liquid crystal out-coupler like liquid crystal out-coupler 470 may be modulated by controller 430 to be opaque. By modulating a region of the liquid crystal out-coupler to be opaque, a light signal or multiple light signals when incident on the opaque region will reflect back into the volume of optically transparent material and propagate further down the waveguide before being out-coupled. In the case of a single region liquid crystal out-coupler, the liquid crystal out-coupler would need to be modulated from opaque to transmissive before the second incidence of the light signal on the out-coupler. In the case of a liquid crystal out-coupler with multiple independently modulatable regions, the region where the incidence first occurs will be modulated to opaque while the region where the second incidence occurs will be modulated to be transmissive (depending on the size of the regions, the regions of first and second incidence may be the same region or different regions).

In other implementations, each of liquid crystal in-coupler 420 and liquid crystal out-coupler 470 may be modulated by a distinct controller instead of the same controller.

Figure 5:
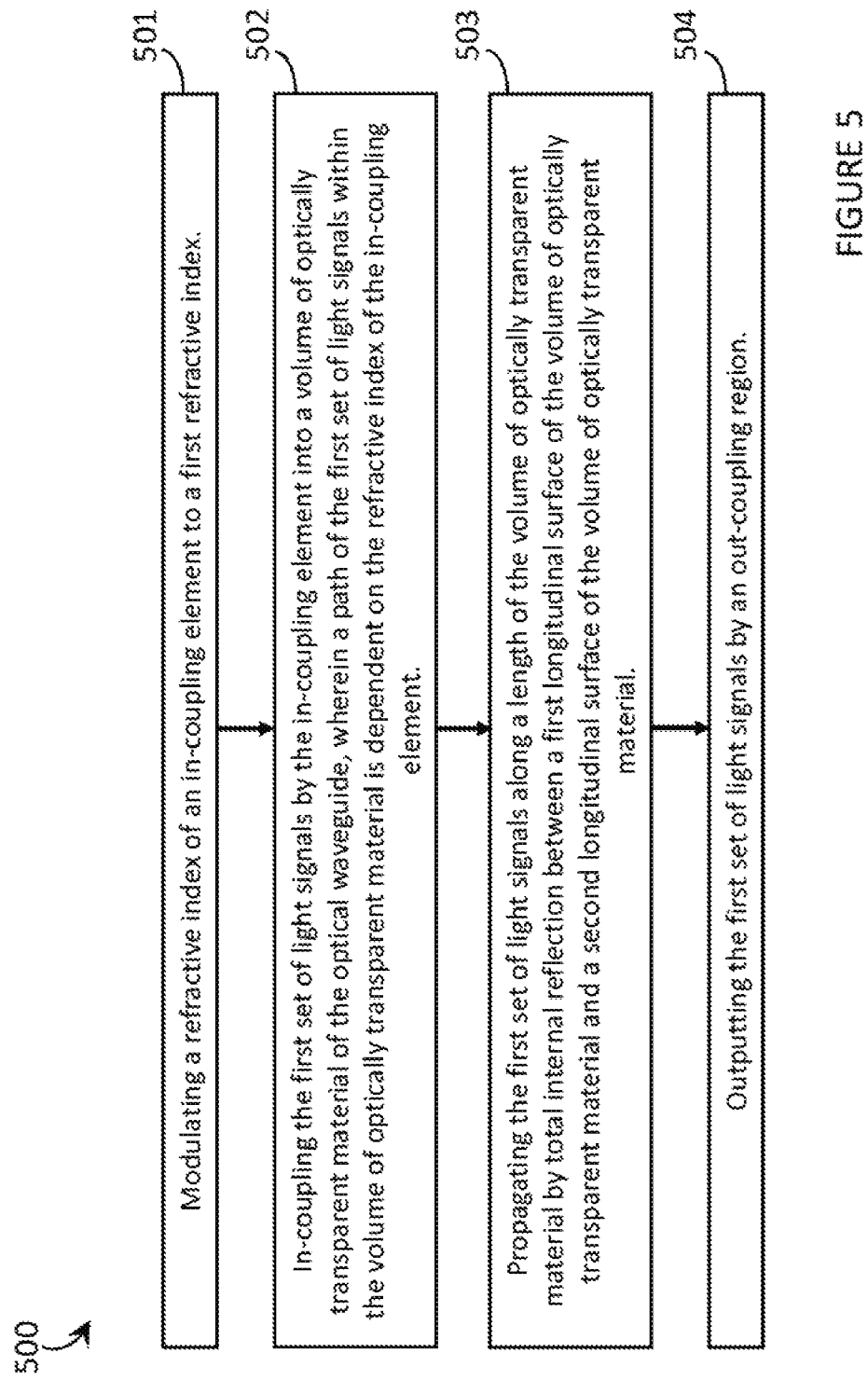
FIG. 5 is a flow diagram of a method of operating an optical waveguide with a liquid crystal in-coupler in accordance with the present systems, devices, and methods.

FIG. 5 is a flow diagram of a method 500 of operating an optical device with a liquid crystal in-coupler in accordance with the present systems, devices, and methods. The optical device of FIG. 5 may be similar to optical devices 100*a*, 100*b*, and 100*c* from FIG. 1. For example, the optical device may include a waveguide comprising a volume of optically transparent material having a first longitudinal surface positioned opposite a second longitudinal surface across a width of volume of optically transparent material, a liquid crystal in-coupler, a controller communicatively coupled to the liquid crystal in-coupler, and an out-coupler. Method 500 includes acts 501, 502, 503, and 504, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiment.

At 501, a refractive index of the liquid crystal in-coupler is modulated to a first refractive index by the controller. The controller may modulate the refractive index of the liquid crystal in-coupler by altering a voltage (or another modulating signal) applied to the liquid crystal in-coupler. The liquid crystal may operate in a positive mode wherein a higher voltage results in a higher opacity, or a negative mode wherein a higher voltage results in a lower opacity. The liquid crystal in-coupler may comprise multiple independently modulatable regions which may be modulated by the controller to each have a respective first refractive index, wherein the refractive index of each respective region may be different from or the same as the refractive indices of the other regions. The controller may be communicatively coupled to a processor which modulates the output of signals from the controller. The processor may be communicatively coupled to a non-transitory processor-readable storage medium and the processor may execute data and/or instruction from the non-transitory processor readable storage medium to modulate the controller. Notably, the modulation of the refractive index of the liquid crystal in-coupler can occur just before or during incidence of light signals, and will in many instances be concurrent or even simultaneous.

At 502, a first set of light signals is in-coupled into the volume of optically transparent material of the waveguide, wherein a path (or paths) of the first set of light signals within the volume of optically transparent material is dependent on the first refractive index of the liquid crystal in-coupler. That is, the path of the light signals is altered (or remains unaltered) in response to the refractive index of the liquid crystal in-coupler, resulting in the light signals being steered by the liquid crystal in-coupler. The path of an individual light signal may also be dependent on the wavelength of the light signal, the location of incidence of the light signal on the liquid crystal in-coupler, and/or the angle of incidence of the light signal on the liquid crystal in-coupler. The light signals are in-coupled on a path that will eventually result in a desired image or part of an image at the desired location, for example at an eye of a user. If the liquid crystal in-coupler comprises multiple independently modulatable regions the path of an individual light signal is dependent on the modulatable region upon which the individual light signal is incident. The liquid crystal in-coupler may be present on the exterior of the volume of optically transparent material or may be located inside the volume of optically transparent material. If located inside the volume of optically transparent material, the liquid crystal in-coupler may be at or proximate the first longitudinal surface of the second longitudinal surface, or may be embedded within the volume of optically transparent material not at or proximate a surface.

At 503, the first set of light signals are propagated along a length of the volume of optically transparent material by total internal reflection between the first longitudinal surface and the second longitudinal surface.

At 504, the first set of light signals are output from the waveguide by the out-coupler. The first set of light signals are output from the optical waveguide on a path that creates the desired image or part of an image at the desired location. The output path of an individual light signal may depend on the wavelength of the light signal, the location of incidence of the light signal on the out-coupler, and/or the angle of incidence of the light signals on the out-coupler. The out-coupler may be at or proximate the first longitudinal surface and may out-couple the first set of light signals by reflection or the out-coupler may be at or proximate the second longitudinal surface and may out-couple the first set of light signals by transmission.

Method 500 may further include repeating acts 501, 502, 503, 504, and 505 with a second set of light signals, wherein the controller modulates the liquid crystal in-coupler to have a second refractive index, or if the liquid crystal in-coupler has multiple independently modulatable regions, a second set of refractive indices. This may be repeated for other sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g. raster scanning). If each set of light signals comprises multiple light signals, modulating the refractive index of the liquid crystal in-coupler may steer an exit pupil of an image (or portion of an image) or other desired pattern created by the multiple light signals.

In some implementations, the out-coupler may be a liquid crystal out-coupler which is communicatively coupled to the controller (or may be communicatively coupled to a second, distinct controller) and the method may further include modulating the refractive index of the liquid crystal out-coupler to a third refractive index (the third refractive index may be the same as either the first or second refractive index and may be different from both the first or second refractive index) and out-coupling a set of light signals on output path(s) which are dependent on the refractive index of the liquid crystal out-coupler. The output paths of the light signals may also be dependent on the wavelength of the light signals, the location of incidence of the light signals on the liquid crystal out-coupler, and/or the angle of incidence of the light signals on the liquid crystal out-coupler.

Figure 6:
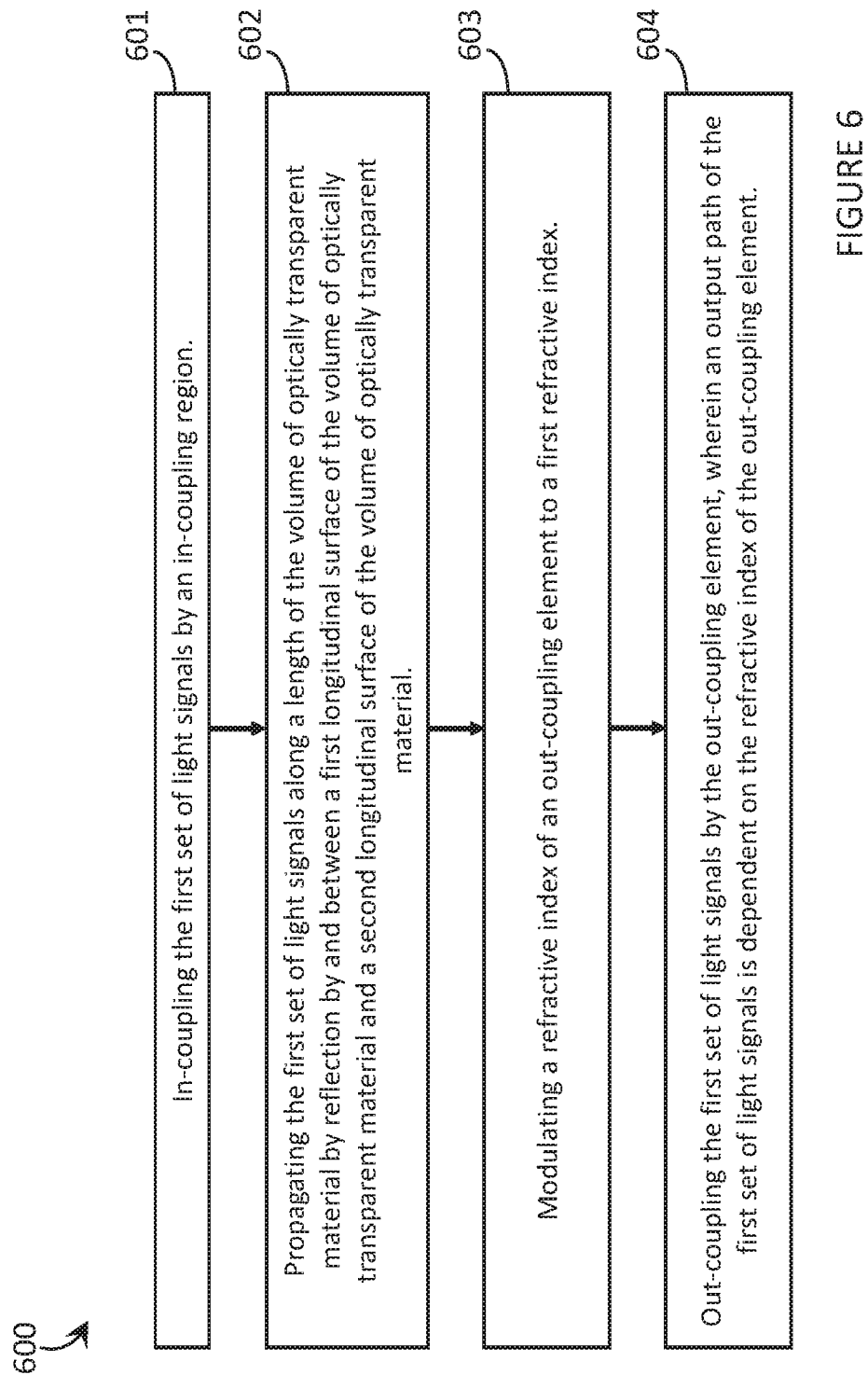
FIG. 6 is a flow diagram of a method of operating an optical waveguide with a liquid crystal out-coupler in accordance with the present systems, devices, and methods.

FIG. 6 is a flow diagram of a method of operating an optical waveguide with a liquid crystal out-coupler in accordance with the present systems, devices, and methods. The optical device of FIG. 6 may be similar to optical devices 200a, 200b, and 200c from FIG. 1. The optical device includes a waveguide comprising a volume of optically transparent material having a first longitudinal surface positioned opposite a second longitudinal surface across a width of volume of optically transparent material, an in-coupler, a liquid crystal out-coupler, and a controller communicatively coupled to the liquid crystal out-coupler. Method 600 includes acts 601, 602, 603, and 604, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiment.

At 601, a first set of light signals are in-coupled into the waveguide by the in-coupler. That is, the first set of light signals are in-coupled into the volume of optically transparent material on the desired path to eventually create a desired image or part of an image at a desired location, for example an eye of a user. The path of an individual light signal may depend on the wavelength of the light signal, the location of incidence of the light signal on the in-coupler, and/or the angle of incidence of the light signals on the in-coupler. The in-coupler may be at or proximate the first longitudinal surface and may in-couple the first set of light signals by reflection or the in-coupler may be at or proximate the second longitudinal surface and may in-couple the first set of light signals by transmission.

At 602, the first set of light signals are propagated along a length of the volume of optically transparent material by total internal reflection between the first longitudinal surface and the second longitudinal surface.

At 603, a refractive index of the liquid crystal out-coupler is modulated to a first refractive index by the controller. The controller may modulate the refractive index of the liquid crystal out-coupler by altering a voltage (or another modulating signal) applied to the liquid crystal in-coupler. The liquid crystal may operate in a positive mode wherein a higher voltage results in a higher opacity, or a negative mode wherein a higher voltage results in a lower opacity. The liquid crystal out-coupler may comprise multiple independently modulatable regions which may be modulated by the controller to each have a respective first refractive index, wherein the refractive index of each respective region may be different from or the same as the refractive indices of the other regions. The controller may be communicatively coupled to a processor which modulates the output of signals from the controller. The processor may be communicatively coupled to a non-transitory processor-readable storage medium and the processor may execute data and/or instruction from the non-transitory processor readable storage medium to modulate the controller.

At 604, the first set of light signals is output, for example towards the eye of the user, by the liquid crystal out-coupler, wherein an output path of the first set of light signals is dependent on the refractive index of the liquid crystal out-coupler. That is, the path of the light signals is altered (or remains unaltered) in response to the refractive index of the liquid crystal out-coupler, resulting in the light signals being steered by the liquid crystal out-coupler. The path of an individual light signal may also be dependent on the wavelength of the light signal, the location of incidence of the light signal on the liquid crystal out-coupler, and/or the angle of incidence of the light signal on the liquid crystal out-coupler. The light signals are output on a path that will result in a desired image or part of an image at a desired location, for example at the eye of the user. If the liquid crystal out-coupler comprises multiple independently modulatable regions, the path of an individual light signal is dependent on the modulatable region upon which the individual light signal is incident. The liquid crystal out-coupler may be at or proximate the first longitudinal surface and may out-couple the first set of light signals by reflection, or the liquid crystal out-coupler may be at or proximate the second longitudinal surface and may out-couple the first set of light signals by transmission.

Method 600 may further include repeating acts 601, 602, 603, 604, and 605 with a second set of light signals, wherein the controller modulates the liquid crystal in-coupler to have a second refractive index, or if the liquid crystal in-coupler has multiple independently modulatable regions, a second set of refractive indices. This may be repeated for other sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g., raster scanning). If each of light signals comprises multiple light signals, modulating the refractive index of the liquid crystal in-coupler may steer an exit pupil of an image (or portion of an image) or other desired pattern created by the multiple light signals.

Alternatively, a waveguide may include both a liquid crystal in-coupler and a liquid crystal out-coupler, wherein both the liquid crystal in-coupler and the liquid crystal out-coupler are communicatively coupled to a controller (either the same controller or two distinct controllers). The method for operating such an optical device would include modulating the refractive indices of both the liquid crystal in-coupler and the liquid crystal out-coupler by the respective controllers to steer both the in-coupling paths of light signals and the out-coupling paths of light signals to create an image or part of an image.

Figure 7:
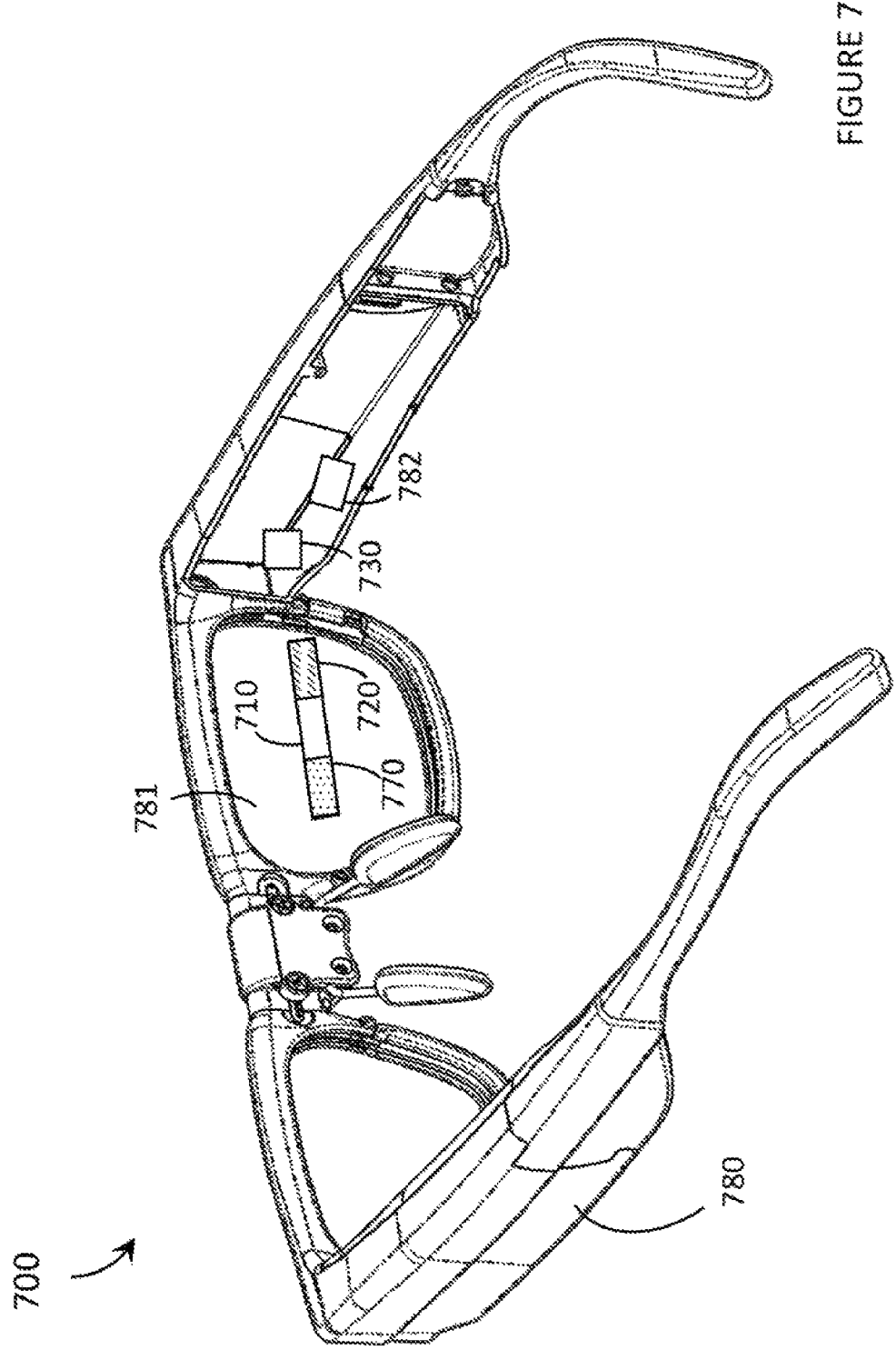
FIG. 7 is a isometric view of a wearable heads-up display with an optical waveguide with a liquid crystal in-coupler and a liquid crystal out-coupler in accordance with the present systems, devices, and methods.

FIG. 7 is a schematic diagram of a wearable heads-up display (WHUD) 700 with a waveguide with a liquid crystal in-coupler 720 and a liquid crystal out-coupler 770 in accordance with the present systems, devices, and methods. WHUD 700 includes a support structure 780 with the shape and appearance of a pair of eyeglasses, and eyeglass lens 781 carried by support structure 780, a projector 782 having at least one light source and carried by support structure 780, and a waveguide. Projector 782 includes at least one light source to generate light signals. Projector 782 may be a scanning projector (e.g., a scanning laser projector) and may include a scanner to scan the light signals, such as a MEMS scan mirror. The waveguide includes a volume of optically transparent material 710, liquid crystal in-coupler 720, and liquid crystal out-coupler 770. Liquid crystal in-coupler 720 and liquid crystal out-coupler 770 are communicatively coupled to a controller (e.g., circuitry, micro-controller) 730 (communicative coupling not shown to reduce clutter). Controller 730 and projector 782 may be communicatively coupled to a processor (e.g., microprocessor) which modulates the output of signals from controller 730 and the generation of light signals by projector 782. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 730 and projector 782. Controller 730 and projector 782 may each be communicatively coupled to respective processor. WHUD 700 operates as follows.

The at least one light source of projector 782 generates a first set of light signals. The first set of light signals may be a single beam of light or may be multiple light signals. The first set of light signals is directed towards and is incident on liquid crystal in-coupler 720. The first set of light signals may be directed towards liquid crystal in-coupler 720 by a scanner, such as a MEMS mirror. Liquid crystal in-coupler 720 is modulated to have a first refractive index by controller 730 (this modulation may before generation of the light signals or incidence of the light signals on liquid crystal in-coupler 730). The first set of light signals are in-coupled into the volume of optically transparent material by liquid crystal in-coupler 720. That is, the path of the first set of light signals is altered (or remains unaltered) in response to the refractive index of liquid crystal in-coupler 720, resulting in the light signals being steered by liquid crystal in-coupler 720. The first set of light signals is in-coupled on a path that will eventually result in a desired image or part of an image at the eye of a user. The path of an individual light signal may be dependent on the wavelength of the light signal, the location of incidence of the light signal on liquid crystal in-coupler 720, and/or the angle of incidence of the light signal on liquid crystal in-coupler 720. If liquid crystal in-coupler 720 comprises multiple independently modulatable regions the path of an individual light signal is dependent on the modulatable region upon which the individual light signal is incident. The first set of light signals is propagated down a length of volume of optically transparent material 710 by total internal reflection between a first longitudinal surface of volume of optically transparent material 710 and a second longitudinal surface of volume of optically transparent material 710. Upon incidence of the first set of light signals on liquid crystal out-coupler 770, the first set of light signals it output from the waveguide towards an eye of the user. That is, the path of the first set of light signals is altered (or remains unaltered) in response to the refractive index of liquid crystal out-coupler 770, resulting in the first set of light signals being steered by liquid crystal out-coupler 770. The first set of light signals is output on a path that will result in a desired image or part of an image at the eye of the user. The path of an individual light signal may be dependent on the wavelength of the light signal, the location of incidence of the light signal on the liquid crystal out-coupler, and/or the angle of incidence of the light signal on the liquid crystal out-coupler. If liquid crystal out-coupler 770 comprises multiple independently modulatable regions the path of an individual light signal is dependent on the modulatable region upon which the individual light signal is incident. The projector then generates a second set of light signals which are in-coupled into volume of optically transparent material 710 and out-coupled out of the waveguide in the same manner as the first set of light signals but wherein the controller modulates the refractive indices of liquid crystal in-coupler 720 and liquid crystal out-coupler 770 to create the desired image or portion of an image at the eye of the user. This process can be repeated n times, where n is any positive integer. When a first set of light signals displays an entire image at the eye of the user, repeating the process n times may result in displaying several images at the eye of the user over time and may be used to steer the exit pupil of the display. An eyetracker may be used to determine how the refractive indices of liquid crystal in-coupler 720 and liquid crystal out-coupler 770 may be modulated to steer the exit pupil. When a first set of light signals only displays a portion of an image at the eye of the user and subsequent sets of light signals display respective different portions of the same image, repeating the process n times may result in displaying portions of an image to create a total image at the eye of the user. WHUD 700 is shown with display apparatus (projector and waveguide) on only one side but could, for example, have a display for each eye of the user. Images provide to each side may differ from one another to, for instance, create a sense of depth.

Figure 8:
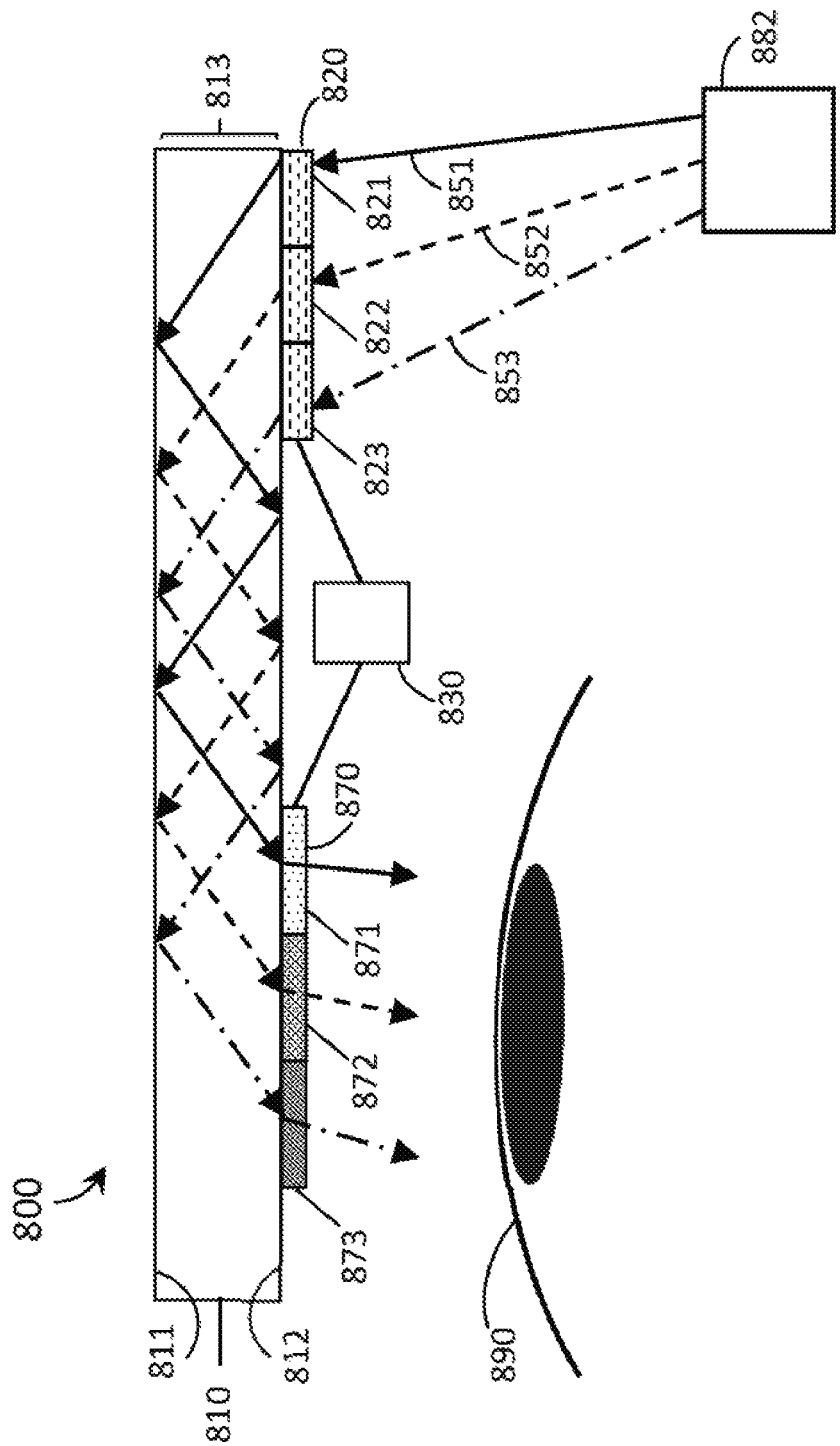
FIG. 8 is a schematic diagram of a wearable heads-up display with a projector, a liquid crystal in-coupler with multiple modulatable regions and a liquid crystal out-coupler with multiple modulatable regions in accordance with the present systems, devices, and methods.

FIG. 8 is a schematic diagram of a WHUD 800 with a projector 882, a liquid crystal in-coupler 820 with multiple modulatable regions 821, 822, and 823 and a liquid crystal out-coupler 870 with multiple modulatable regions 871, 872, and 873 in accordance with the present systems, devices, and methods. Optical device 800 includes a waveguide comprising a volume of optically transparent material 810 having a first longitudinal surface 811 positioned opposite a second longitudinal surface 812 across a width 813 of volume of optically transparent material 810, a liquid crystal in-coupler 820 with multiple modulatable regions 821, 822, and 823, a liquid crystal out-coupler 870 with multiple modulatable regions 871, 872, and 873, and a controller (e.g., circuitry, micro-controller) 830 communicatively coupled to both liquid crystal in-coupler 820 and liquid crystal out-coupler 870. Projector 882 includes at least one light source to generate light signals, including light signals 851, 852, and 853. Projector 882 may be a scanning projector (e.g., a scanning laser projector) and may include a scanner to scan the light signals, such as a MEMS scan mirror. Controller 830 modulates each of modulatable regions 821, 822, and 823, independently and may be separately communicatively coupled to each modulatable region (controller 830 is shown as having only one coupling to each of liquid crystal in-coupler 820 and liquid crystal out-coupler 870 to reduce clutter). Controller 830 is shown in this configuration solely for clarity and in an actual implementation would not be so located. Controller 830 may be communicatively coupled to a processor (e.g., microprocessor) which modulates the output of signals from controller 830. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate controller 830. In FIG. 8, liquid crystal in-coupler 820 and liquid crystal out-coupler 870 each have three distinct, modulatable regions but in other implementations there may be any number of distinct, modulatable regions greater than one.

The operation of WHUD 800 is similar to the operation of optical device 400 which the addition of projector 882 and an eye of a user 890. Projector 882 generates a first set of light signals which are directed towards liquid crystal in-coupler 820. Light signals 851, 852, and 853 follow the same path through liquid crystal in-coupler 820, volume of optically transparent material 810, and liquid crystal out-coupler 870 as light signals 451, 452, and 453 in FIG. 4 and the same modulation of modulatable regions 821, 822, 823, 871, 872, and 873 by controller 830 occurs. Light signals 851, 852, and 853 are out-coupled by liquid crystal out-coupler 870 towards eye 890 (eye 890 is not shown to scale). The paths of light signals 851, 852, and 853 are dependent on the refractive indices of the respective modulatable regions 821, 822, 823, 871, 872, and 873 upon which light signals 851, 852, and 853 are incident. The paths of light signals 851, 852, and 852 may also be dependent on the wavelengths of the light signals, the locations of incidence of the light signals on liquid crystal in-coupler 820 and liquid crystal out-coupler 870, and the angles of incidence of the lights signals on liquid crystal in-coupler 820 and liquid crystal out-coupler 870.

Figure 9:
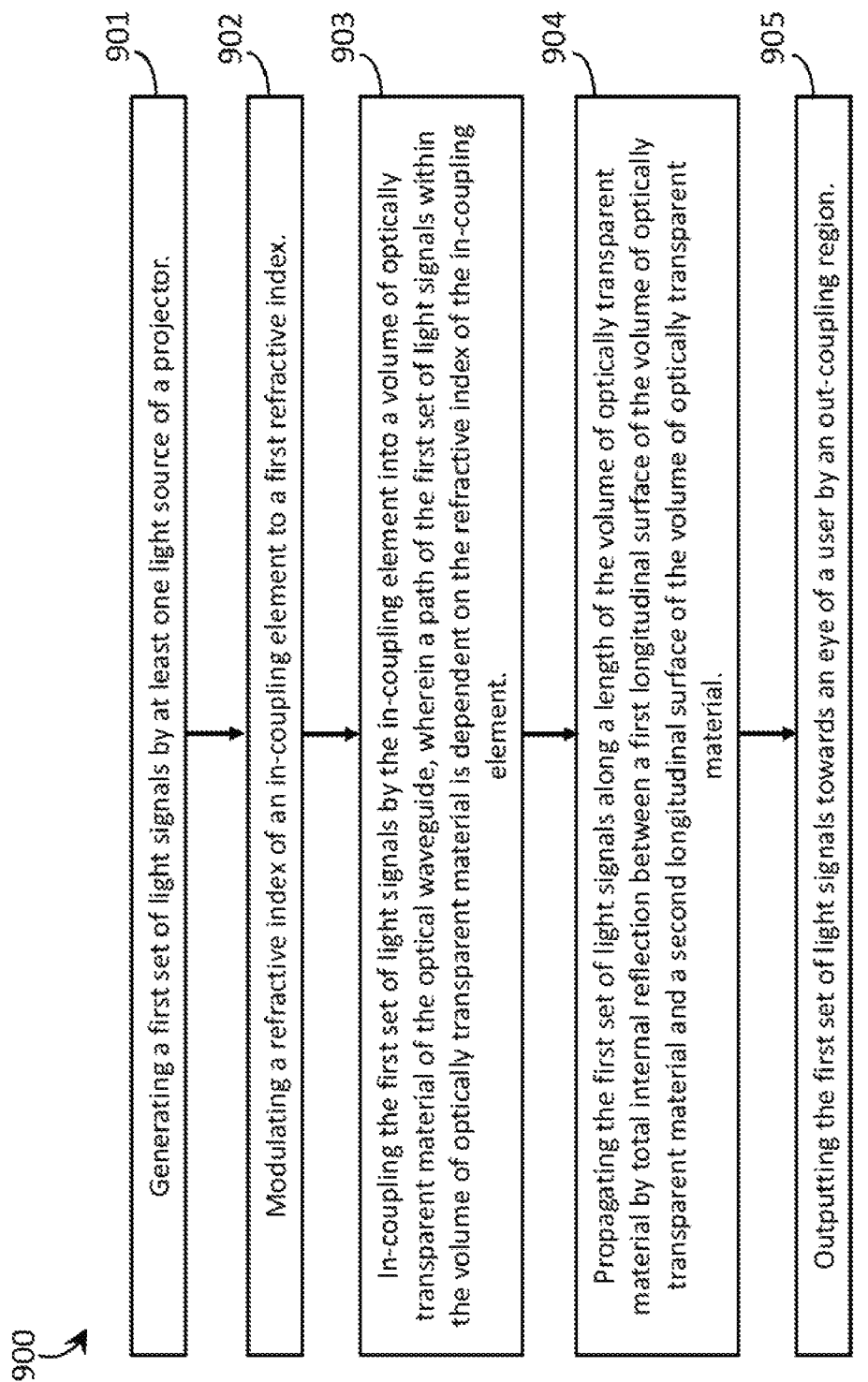
FIG. 9 is a flow diagram of a method of operating a wearable heads-up display with an optical waveguide with a liquid crystal in-coupler in accordance with the present systems, devices, and methods.

FIG. 9 is a flow diagram of a method 900 of operating a wearable heads-up display (WHUD) with a liquid crystal in-coupler in accordance with the present systems, devices, and methods. The WHUD of FIG. 9 includes a support structure which in use is worn on the head of user and which carries a projector and a waveguide. The projector includes at least one light source to generate light signals. The projector may be a scanning projector which includes a scanner operable to spatially scan the light signals over an area, such as a MEMS scan mirror. The waveguide includes a volume of optically transparent material having a first longitudinal surface positioned opposite a second longitudinal surface across a width of the volume of optically transparent material, a liquid crystal in-coupler, a controller (e.g., circuitry, micro-controller) communicatively coupled to the liquid crystal in-coupler, and an out-coupler. Method 900 includes acts 901, 902, 903, 904, and 905, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiment.

At 901, at least one light source of the projector generates a first set of light signals. The first set of light signals may be a single light signal or may be multiple light signals. The light signals may be directed away from the projector via scanning by the scanner (e.g., MEMS scan mirror, rotating mirror, pivoting mirror).

At 902, a refractive index of the liquid crystal in-coupler is modulated to a first refractive index by the controller. The controller may modulate the refractive index of the liquid crystal in-coupler by altering a voltage (or another modulating signal) applied to the liquid crystal in-coupler. The liquid crystal may operate in a positive mode wherein a higher voltage results in a higher opacity, or a negative mode wherein a higher voltage results in a lower opacity. The liquid crystal in-coupler may comprise multiple independently modulatable regions which may be modulated by the controller to each have a respective first refractive index, wherein the refractive index of each respective region may be different from or the same as the refractive indices of the other regions. The controller may be communicatively coupled to a processor (e.g., microprocessor) which modulates the output of signals from the controller. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate the controller.

At 903, the first set of light signals is in-coupled into the volume of optically transparent material of the waveguide, wherein a path (or paths) of the first set of light signals within the volume of optically transparent material is dependent on the first refractive index of the liquid crystal in-coupler. That is, the path of the light signals is altered (or remains unaltered) in response to the refractive index of the liquid crystal in-coupler, resulting in the light signals being steered by the liquid crystal in-coupler. The path of an individual light signal may also be dependent on the wavelength of the light signal, the location of incidence of the light signal on the liquid crystal in-coupler, and/or the angle of incidence of the light signal on the liquid crystal in-coupler. The light signals are in-coupled on a path that will eventually result in a desired image or part of an image at the eye of a user. If the liquid crystal in-coupler comprises multiple independently modulatable regions the path of an individual light signal is dependent on the modulatable region upon which the individual light signal is incident. The liquid crystal in-coupler may be present on the exterior of the volume of optically transparent material or may be located inside the volume of optically transparent material. If located inside the volume of optically transparent material, the liquid crystal in-coupler may be at or proximate the first longitudinal surface of the second longitudinal surface, or may be embedded within the volume of optically transparent material not at or proximate a surface.

At 904, the first set of light signals are propagated along a length of the volume of optically transparent material by total internal reflection between the first longitudinal surface and the second longitudinal surface.

At 905, the first set of light signals are output from the waveguide towards an eye of the user by the out-coupler. The first set of light signals are output from the waveguide on a path that creates the desired image or part of an image at the eye of the user. The output path of an individual light signal may depend on the wavelength of the light signal, the location of incidence of the light signal on the out-coupler, and/or the angle of incidence of the light signals on the out-coupler. The out-coupler may be at or proximate the first longitudinal surface and may out-couple the first set of light signals by reflection or the out-coupler may be at or proximate the second longitudinal surface and may out-couple the first set of light signals by transmission.

Method 900 may further include repeating acts 901, 902, 903, 904, and 905 with a second set of light signals, wherein the controller modulates the liquid crystal in-coupler to have a second refractive index, or if the liquid crystal in-coupler has multiple independently modulatable regions, a second set of refractive indices. This may be repeated for other sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g., raster scanning). If each set of light signals comprises multiple light signals, modulating the refractive index of the liquid crystal in-coupler may steer an exit pupil of an image (or portion of an image) or other desired pattern created by the multiple light signals. In some implementations, the out-coupler may be a liquid crystal out-coupler which is communicatively coupled to the controller (or may be communicatively coupled to a second, distinct controller) and the method may further include modulating the refractive index of the liquid crystal out-coupler to a third refractive index (the third refractive index may be the same as either the first or second refractive index and may be different from both the first or second refractive index) and out-coupling a set of light signals on output path(s) which are dependent on the refractive index of the liquid crystal out-coupler. The output paths of the light signals may also be dependent on the wavelength of the light signals, the location of incidence of the light signals on the liquid crystal out-coupler, and/or the angle of incidence of the light signals on the liquid crystal out-coupler.

Figure 10:
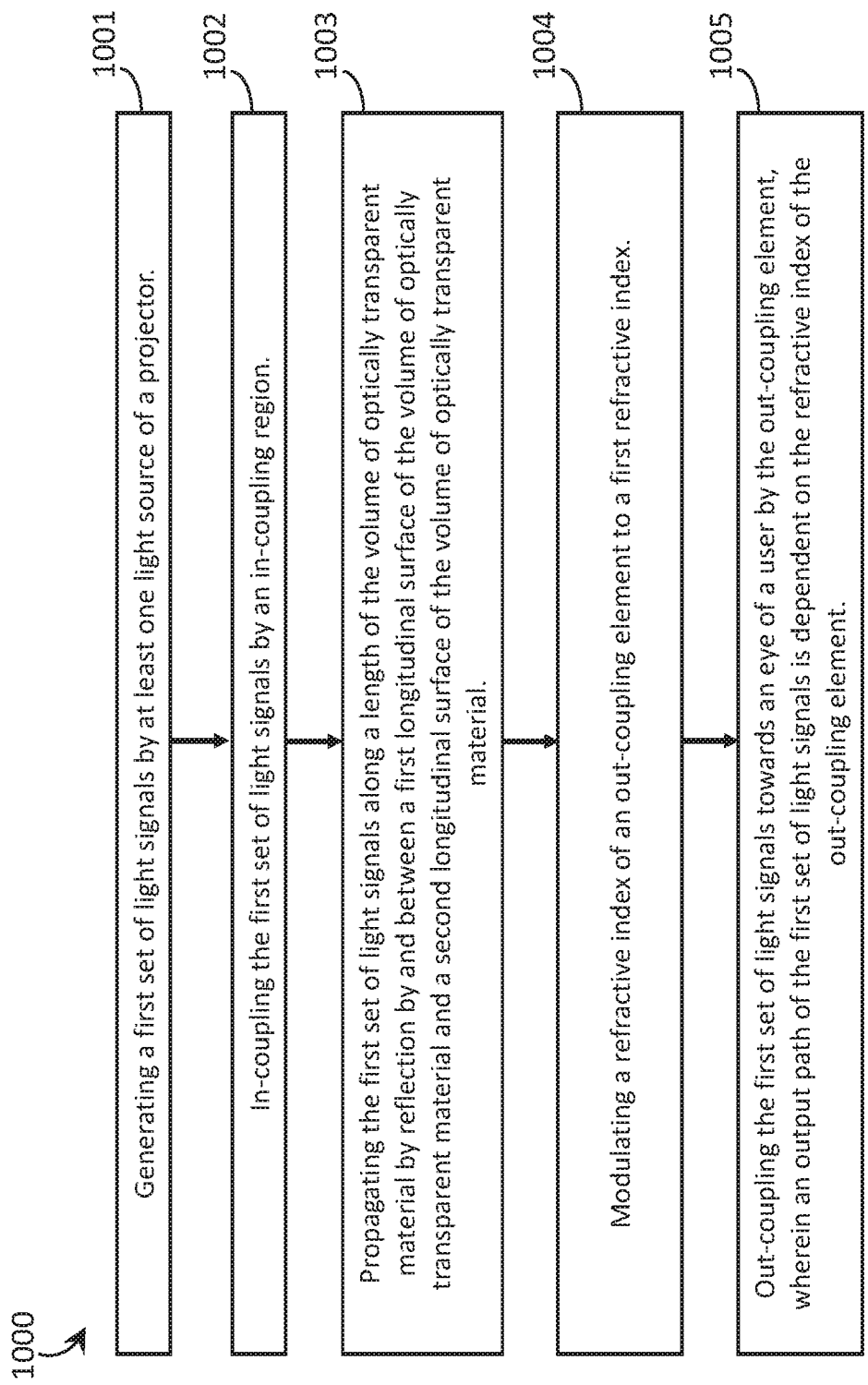
FIG. 10 is a flow diagram of a method of operating a wearable heads-up display with an optical waveguide with a liquid crystal out-coupler in accordance with the present systems, devices, and methods.

FIG. 10 is a flow diagram of a method 1000 of operating a wearable heads-up display with an waveguide with a liquid crystal out-coupler in accordance with the present systems, devices, and methods. The WHUD of FIG. 10 includes a support structure which in use is worn on the head of user and which carries a projector and an waveguide. The projector includes at least one light source to generate light signals. The projector may be a scanning projector which includes a scanner operable to spatially scan the light signals over an area, such as a MEMS scan mirror. The waveguide includes a volume of optically transparent material having a first longitudinal surface positioned opposite a second longitudinal surface across a width of volume of optically transparent material, an in-coupler, a liquid crystal out-coupler, and a controller (e.g., circuitry, micro-controller) communicatively coupled to the liquid crystal out-coupler. Method 1000 includes acts 1001, 1002, 1003, 1004, and 1005, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiment.

At 1001, at least one light source of the projector generates a first set of light signals. The first set of light signals may be a single light signal or may be multiple light signals. The light signals may be directed away from the projector via scanning by the scanner (e.g., MEMS scan mirror, rotating mirror, pivoting mirror).

At 1002, the first set of light signals are in-coupled into the volume of optically transparent material by the in-coupler. That is, the first set of light signals are in-coupled into the volume of optically transparent material on the desired path to eventually create a desired image or part of an image at the eye of the user. The path of an individual light signal may depend on the wavelength of the light signal, the location of incidence of the light signal on the out-coupler, and/or the angle of incidence of the light signals on the out-coupler. The in-coupler may be at or proximate the first longitudinal surface and may in-couple the first set of light signals by reflection or the in-coupler may be at or proximate the second longitudinal surface and may in-couple the first set of light signals by transmission.

At 1003, the first set of light signals are propagated along a length of the volume of optically transparent material by total internal reflection between the first longitudinal surface and the second longitudinal surface.

At 1004, a refractive index of the liquid crystal out-coupler is modulated to a first refractive index by the controller. The controller may modulate the refractive index of the liquid crystal out-coupler by altering a voltage (or another modulating signal) applied to the liquid crystal in-coupler. The liquid crystal may operate in a positive mode wherein a higher voltage results in a higher opacity, or a negative mode wherein a higher voltage results in a lower opacity. The liquid crystal out-coupler may comprise multiple independently modulatable regions which may be modulated by the controller to each have a respective first refractive index, wherein the refractive index of each respective region may be different from or the same as the refractive indices of the other regions. The controller may be communicatively coupled to a processor (e.g., microprocessor) which modulates the output of signals from the controller. The processor may be communicatively coupled to a non-transitory processor-readable storage medium (e.g., memory circuits such as ROM, RAM, FLASH, EEPROM, memory registers, magnetic disks, optical disks, other storage) and the processor may execute data and/or instruction from the non-transitory processor readable storage medium to modulate the controller.

At 1005, the first set of light signals is output towards the eye of the user by the liquid crystal out-coupler, wherein an output path of the first set of light signals is dependent on the refractive index of the liquid crystal out-coupler. That is, the path of the light signals is altered (or remains unaltered) in response to the refractive index of the liquid crystal out-coupler, resulting in the light signals being steered by the liquid crystal out-coupler. The path of an individual light signal may be dependent on the wavelength of the light signal, the location of incidence of the light signal on the liquid crystal out-coupler, and/or the angle of incidence of the light signal on the liquid crystal out-coupler. The light signals are output on a path that will result in a desired image or part of an image at the eye of the user. If the liquid crystal out-coupler comprises multiple independently modulatable regions the path of an individual light signal is dependent on the modulatable region upon which the individual light signal is incident. The liquid crystal out-coupler may be at or proximate the first longitudinal surface and may out-couple the first set of light signals by reflection, or the liquid crystal out-coupler may be at or proximate the second longitudinal surface and may out-couple the first set of light signals by transmission.

Method 1000 may further include repeating acts 1001, 1002, 1003, 1004, and 1005 with a second set of light signals, wherein the controller modulates the liquid crystal in-coupler to have a second refractive index, or if the liquid crystal in-coupler has multiple independently modulatable regions, a second set of refractive indices. This may be repeated for other sets of light signals. If each set of light signals is a single light signal, an image or other desired pattern of light may be created by modulating the refractive index of the liquid crystal in-coupler to steer further sets of light signals as they are generated over time. That is, the refractive index of the liquid crystal in-coupler may enable "scanning" of subsequent single light signals to create an image (e.g., raster scanning). If each set of light signals comprises multiple light signals, modulating the refractive index of the liquid crystal in-coupler may steer an exit pupil of an image (or portion of an image) or other desired pattern created by the multiple light signals.

Alternatively, a WHUD may include both a liquid crystal in-coupler and a liquid crystal out-coupler, wherein both the liquid crystal in-coupler and the liquid crystal out-coupler are communicatively coupled to a controller (either the same controller or two distinct controllers). The method for operating such an waveguide would include modulating the refractive indices of both the liquid crystal in-coupler and the liquid crystal out-coupler by the respective controllers to steer both the in-coupling paths of light signals and the out-coupling paths of light signals to create an image or part of an image at the eye of a user.

Throughout this specification and the drawings various in-coupling and out-coupling paths are discussed and shown. These paths are meant to be exemplary and are not meant to show any actual paths or to represent achievable ranges of directions which light signals can travel in upon in-coupling or out-coupling.

The various embodiments described herein provide systems, devices, and methods for steering light with waveguides. Such are particularly well-suited for use as or in the transparent combiner of wearable heads-up displays ("WHUDs") in order to enable the WHUDs to adopt more aesthetically-pleasing styles and to increase the relative size of the display. Examples of WHUD systems, devices, and methods that are particularly well-suited for use in conjunction with the present systems, devices, and methods for curved lenses with optical waveguides are described in, for example, U.S. Non-Provisional patent application Ser. No. 15/167,458, U.S. Non-Provisional patent application Ser. No. 15/167,472, and U.S. Non-Provisional patent application Ser. No. 15/167,484.

In some implementations, an optical waveguide may terminate at the out-coupling optical grating because there is no desire to propagate light within the optical waveguide beyond that point. However, this can result in a visible seam within or upon the eyeglass lens where the optical waveguide ends. In order to avoid this seam, in some implementations, an optical waveguide may be extended beyond the out-coupling optical grating to the far edge of an eyeglass lens even though there is no intention to propagate light within the optical waveguide beyond the out-coupling optical grating.

In some implementations, an optical waveguide may have cladding on the exterior of the waveguide at the first and second longitudinal surfaces, except where the in-coupler and out-coupler are located, wherein the cladding has a refractive index which enables total internal reflection within the waveguide.

Some of the optical waveguides described herein (particularly those that employ curvature) may introduce optical distortions in displayed images. In accordance with the present systems, devices, and methods, such optical distortions may be corrected (i.e., compensated for) in the software that drives the display engine. For example, the geometrical output of the transparent combiner may be measured without any compensation measure in place and a reverse transform of such output may be applied in the generation of light by the display light source.

The relative positions of optical waveguides within lenses/combiners shown herein are used for illustrative purposes only. In some implementations, it may be advantageous for an optical waveguide to be positioned centrally within a combiner, whereas in other implementations it may be advantageous for an optical waveguide to be positioned off-center. In particular, it may be advantageous for an optical waveguide to couple to the corner of the support structure/glasses frame where the temple of the glasses frame meets the rims, because this is an advantageous location to route display light from a scanning laser projector or microdisplay with minimal impact on form factor.

The various embodiments described herein generally reference and illustrate a single eye of a user (i.e., monocular applications), but a person of skill in the art will readily appreciate that the present systems, devices, and methods may be duplicated in a WHUD in order to provide scanned laser projection and scanned laser eye tracking for both eyes of the user (i.e., binocular applications).

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/167,458, U.S. Non-Provisional patent application Ser. No. 15/167,472, U.S. Non-Provisional patent application Ser. No. 15/167,484, U.S. patent application Ser. No. 15/381,883, US Patent Application Publication No. 2017-0068095, U.S. Provisional Application Ser. No. 62/557,551, and U.S. Provisional Application Ser. No. 62/557,554, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical device comprising:
   an optical waveguide comprising volume of optically transparent material to propagate light signals by total internal reflection, wherein the volume of optically transparent material has a first longitudinal surface and a second longitudinal surface, the second longitudinal surface opposite the first longitudinal surface across a width of the volume of optically transparent material;
   an in-coupler;
   a liquid crystal out-coupler to tunably steer an exit pupil of the optical device; and
   a controller communicatively coupled to the liquid crystal out-coupler, wherein a refractive index of the liquid crystal out-coupler is modulatable to steer the exit pupil of the optical device in response to signals from the controller, and wherein:
   the liquid crystal out-coupler is further configured to raster scan a sequence of light signals to create an image; and
   the refractive index of the liquid crystal out-coupler is further modulatable to raster scan the sequence of light signals to create the image in response to signals from the controller.

2. The optical device of claim 1 wherein the liquid crystal out-coupler comprises a single modulatable region.

3. The optical device of claim 1 wherein the liquid crystal out-coupler comprises at least two distinct, independently modulatable regions.

4. The optical device of claim 1 further comprising a processor communicatively coupled to the controller to modulate the output signals from the controller.

5. The optical device of claim 1 wherein the in-coupler is a liquid crystal in-coupler to tunably steer the light signals and wherein the in-coupler is communicatively coupled to the controller and a refractive index of the in-coupler is modulatable in response to signals from the controller.

6. The optical device of claim 5 wherein the liquid crystal in-coupler comprises a single modulatable region.

7. The optical device of claim 5 wherein the liquid crystal in-coupler comprises at least two distinct, independently modulatable regions.

8. The optical device of claim 1, further comprising:
   as eyetracker to determine modulations of the refractive index of the liquid crystal out-coupler in order to steer the exit pupil of the optical device.

* * * * *